(12) United States Patent
Tanaka et al.

(10) Patent No.: US 7,058,061 B2
(45) Date of Patent: Jun. 6, 2006

(54) DYNAMIC VIRTUAL CHANNEL MANAGEMENT APPARATUS

(75) Inventors: Jun Tanaka, Kawasaki (JP); Michio Kusayanagi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 890 days.

(21) Appl. No.: 10/029,439

(22) Filed: Dec. 14, 2001

(65) Prior Publication Data

US 2002/0054600 A1  May 9, 2002

Related U.S. Application Data

(63) Continuation of application No. PCT/JP99/03361, filed on Jun. 24, 1999.

(51) Int. Cl.
*H04L 12/56* (2006.01)
(52) U.S. Cl. .................................. 370/395.1; 370/395.7
(58) Field of Classification Search ........ 370/229–235, 370/368, 371, 374, 378, 381, 382, 383, 395.7, 370/395.71, 395.72, 412–429, 395.1
See application file for complete search history.

(56) References Cited

U.S. PATENT DOCUMENTS

| | | | | |
|---|---|---|---|---|
| 5,629,936 A | * | 5/1997 | Lee et al. | 370/230 |
| 5,696,764 A | * | 12/1997 | Soumiya et al. | 370/395.41 |
| 6,021,130 A | * | 2/2000 | Kozaki et al. | 370/399 |
| 6,222,823 B1 | * | 4/2001 | Smith et al. | 370/230 |
| 6,504,824 B1 | * | 1/2003 | Tanaka et al. | 370/252 |

FOREIGN PATENT DOCUMENTS

| | | |
|---|---|---|
| JP | 04-17431 | 1/1992 |
| JP | 04-156026 | 5/1992 |
| JP | 06244858 | 9/1994 |
| JP | 09247155 | 9/1997 |
| JP | 09261244 | 10/1997 |
| JP | 10051458 | 2/1998 |
| JP | 10257068 | 9/1998 |
| JP | 11088351 | 3/1999 |

OTHER PUBLICATIONS

Romanow, et al. Dynamics of TCP Traffic over ATM Networks, IEEE Journal on Selected Areas in Communications, vol. 13, No. 4 May 1995.

* cited by examiner

*Primary Examiner*—Dang Ton
*Assistant Examiner*—Phuc Tran
(74) *Attorney, Agent, or Firm*—Katten Muchin Rosenman LLP

(57) ABSTRACT

The present invention includes a detection unit for detecting an active virtual channel of arriving ATM cells, and a management memory unit for managing management information about the detected active virtual channel on a virtual-channel-to-virtual-channel basis, wherein a frame-by-frame process is performed on cells whose virtual channel identifier matches that of an active virtual channel managed by the management memory unit. In this manner, virtual-channel-by-virtual-channel processing is achieved in ATM leased line services that are provided on a virtual-path-by-virtual-path basis, thereby dispensing with needs to register a virtual channel into management memory in advance and allowing a large number of virtual channels to be accommodated.

18 Claims, 39 Drawing Sheets

FIG.2
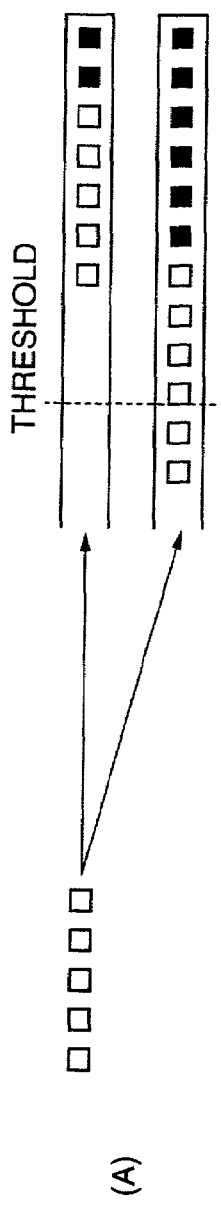
(A) WHERE QUEUE IS LESS THAN THRESHOLD WHEN HEAD CELL ARRIVES
ALL CELLS IN FRAME INPUTTED WHETHER OR NOT THRESHOLD IS EXCEEDED DURING INPUT
(B) WHERE QUEUE EXCEEDS THRESHOLD WHEN HEAD CELL ARRIVES
DISCARD ALL CELLS IN FRAMES, FROM HEAD CELL TO END CELL

DYNAMIC VIRTUAL CHANNEL MANAGEMENT APPARATUS

This application is a continuation of PCT/JP9903361, filed Jun. 24, 1999.

TECHNICAL FIELD

The present invention generally relates to a dynamic virtual channel management apparatus, and especially relates to a dynamic virtual channel management apparatus that is used in ATM communication apparatuses to dynamically manage virtual channels.

BACKGROUND TECHNOLOGY

ATM leased line services, such as an ATM Mega-link service, that are currently available and served by the ATM (Asynchronous Transfer Mode), provide a user with a pipe of a virtual path (VP), and realize a conventional leased line on ATM.

Conversely, an ATM Share-link service which is a lower-priced ATM leased line service gives a user a virtual channel (VC) by guaranteeing only the minimum bandwidth and sharing the bandwidth beyond it with other users to lower cost for the service.

That is, by contracting the ATM Mega-link service in increments of a virtual path, a user can set up an arbitrary number of virtual channels. Conversely, the ATM Share-link service provides is available in increments of a virtual channel, and the user thereof cannot manage an arbitrary number of virtual channels.

For this reason, if a bandwidth sharing with a minimum bandwidth similar to the ATM sharing service can be performed in each virtual path, the user can enjoy an economical service by setting up virtual channel connections freely in the virtual path, using MPOA (MultiProtocol Over ATM) and the like, and by sharing the bandwidth with other users.

In this case, in order to perform a frame-by-frame processing, such as EPD (Early packet Discard) and the like provided with a minimum bandwidth guarantee, a network side has to recognize boundaries of frames. However, so long as a contract is made on a virtual-path-to-virtual-path basis, how virtual channels are multiplexed therein is unknown. Since cell multiplexing is generally carried out as shown in FIG. 1(B), it is difficult to recognize the boundaries of the frame for every virtual channel, unless a terminal side outputs frame by frame as shown in FIG. 1(A). Here, in reference with FIG. 1(A) and (B), a square expresses a cell, a black square expresses a virtual channel 1 of a frame 1, and a virtual channel 1 of a frame 2, and a white square expresses a virtual channel 2 of a frame 1, and a virtual channel 2 of a frame 2.

For this reason, in the ATM Share-link service, a frame information management table is provided to every virtual channel, and each frame is processed while checking whether a cell represents a head, middle or end of the frame in a buffer that performs bandwidth sharing. Here, an example of the frame processing is an EPD shown in FIG. 2 and the like. If the number of cells stored in a queue is not over a threshold when the head cell of the frame arrives as shown in FIG. 2(A), the EPD inputs all cells of the arriving frame into the queue, even if the number of the cells exceeds the threshold on the way. If the number of cells stored in the queue is over the threshold when the head cell of the frame arrives as shown in FIG. 2(B), all cells of the arriving frame, from the head cell to the end cell, will be discarded.

Here, the problem is that a VCI (Virtual Channel Identifier) is unknown because a choice of VCI is at the discretion of users in the contract of a virtual path, causing an inability to perform the frame information management for every virtual channel as described above, which is possible, on the other hand, in the ATM Share-link service because it is a contract for a virtual channel.

As regards the frame processing of EPD and the like, if a virtual channel is prepared beforehand as in a PVC (Permanent Virtual Connection), only a preparation of a management table will be necessary. However, this management table may become large depending upon processes, making it difficult to set up a large number of virtual channels.

In order to realize the EPD, it is necessary to control writing using information about frame position (whether a cell is a head or a middle of a frame) and information about cell memory queue size. FIG. 3 is a block diagram of an example of a conventional EPD processing circuit. In this drawing, a writing control unit 10 discards a head cell and following cells in the same frame, if a queue size of a cell memory 12 is over a predetermined threshold value when the head cell of the frame arrives. If the head cell of the frame arrives when the queue size of the cell memory 12 is not over the predetermined threshold, the head cell and following cells in the same frame will be inputted.

Whether the head cell of the frame was inputted or discarded is managed by a VC management memory 14. The writing control unit 10 decides whether to input or discard at the frame head, the decision thereof is notified to the VC management memory 14, and at other than the head of the frame, the decision information is conversely obtained from the VC management memory 14, and an input to the cell memory 12 is controlled.

In this manner, the VC management memory 14 manages the frame position information and the head cell processing information for each virtual channel, wherein a VPI/VCI (virtual channel identifier, VPI: Virtual Path Identifier) value to be used is set up either by an operator or by a signaling processing unit (set up by a control system in either case), and the frame information of cells that belong to the virtual channel corresponding to the value is managed.

That is, the scalability of the number of virtual channels for frame processing may be restricted by a capacity of the VC management memory. There has been a problem that a table that can process a great number of virtual channels even if there are few virtual channels actually communicating has to be prepared, if virtual channels have to be set up beforehand as conventionally.

DISCLOSURE OF THE INVENTION

General object of the present invention is to provide a memory apparatus that can accommodate a large number of virtual channels, wherein virtual channels not in communication will not occupy resources such as a management memory and the like, virtual channels need not be registered beforehand in the management memory, and processing can be performed to each virtual channel, even if a contract with a user is on a virtual-path-to-virtual-path basis in an ATM leased line service that is for each virtual path.

To achieve the object, the present invention includes a detection unit to detect an active virtual channel currently used by an arriving cell of ATM, and a management memory unit to manage information relative to the active virtual channel detected by the above-mentioned detection unit for every virtual channel, and is configured such that each cell whose virtual channel matches with an active virtual channel managed in the above mentioned management memory unit is processed for each frame.

According to a dynamic virtual channel management apparatus such as above, processes can be performed on a virtual channel basis, and a large number of virtual channels can be accommodated by the ATM leased line service on the virtual path basis, without a necessity to register virtual channels into management memory beforehand.

BRIEF EXPLANATION OF THE DRAWINGS

Other objects, features, and advantages of the present invention will become further clearer by reading following detailed descriptions with reference to the attached drawings.

FIG. 2 describes EPD.

BEST MODE EMBODIMENTS

Hereafter, embodiments of the present invention will be described with reference to drawings.

Figure 1:
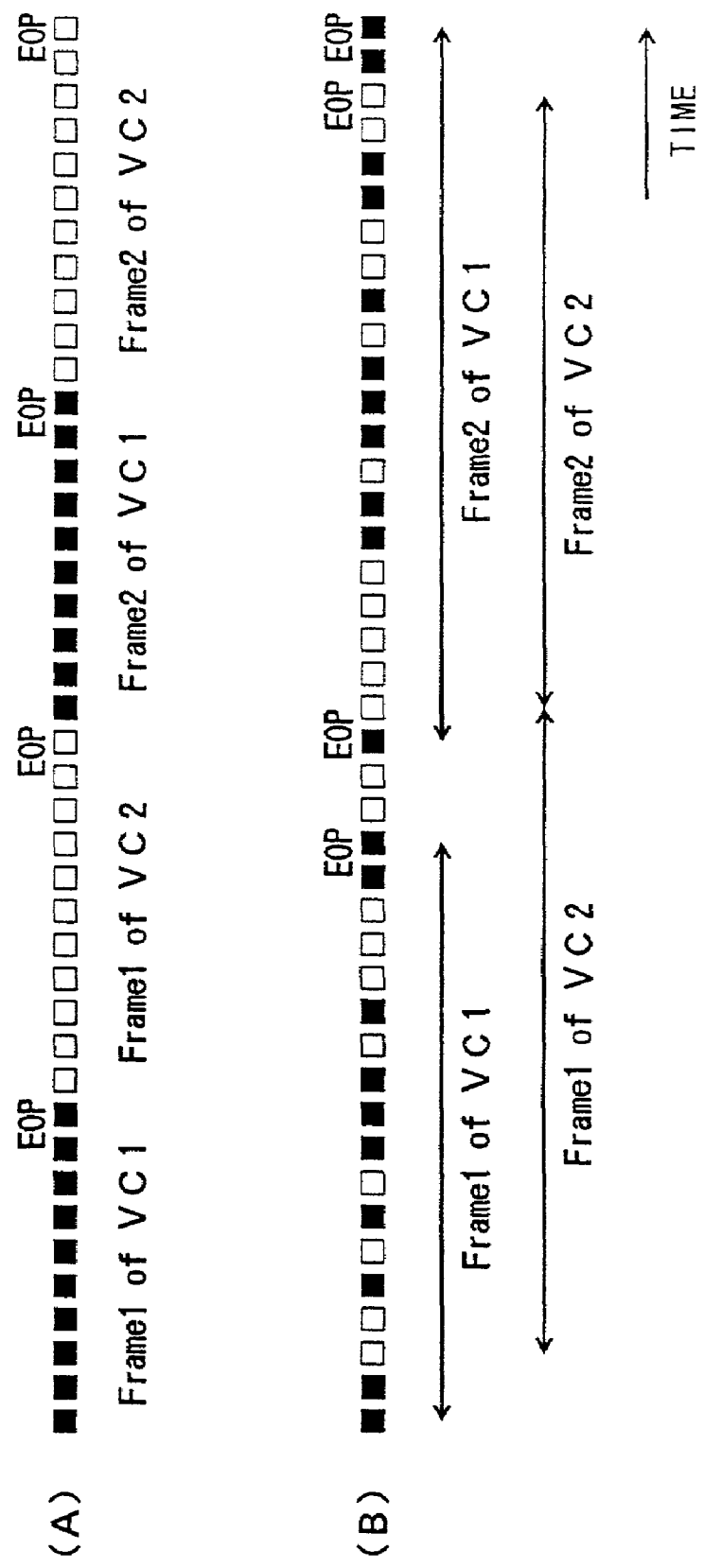
FIG. 1 shows an example of a virtual channel multiplexing.
Figure 3:
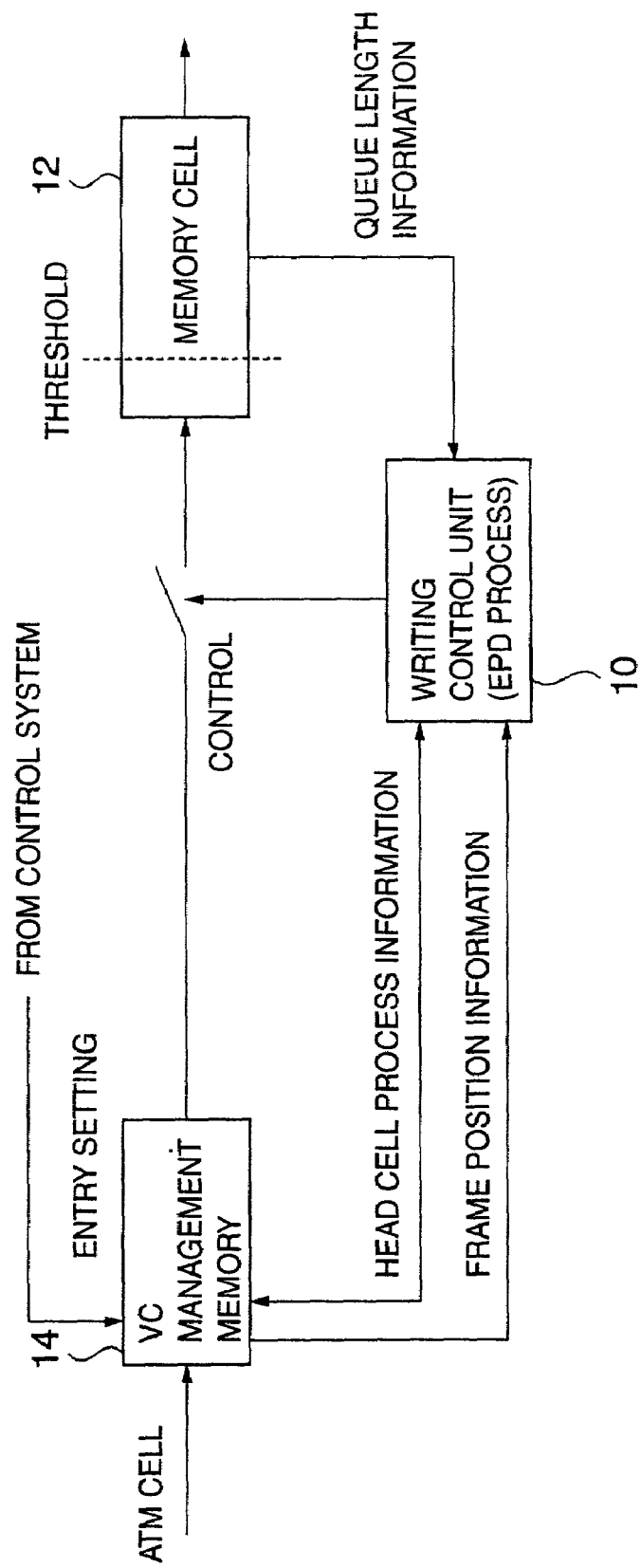
FIG. 3 is a block diagram of an example of a conventional EPD processing circuit.
Figure 4:
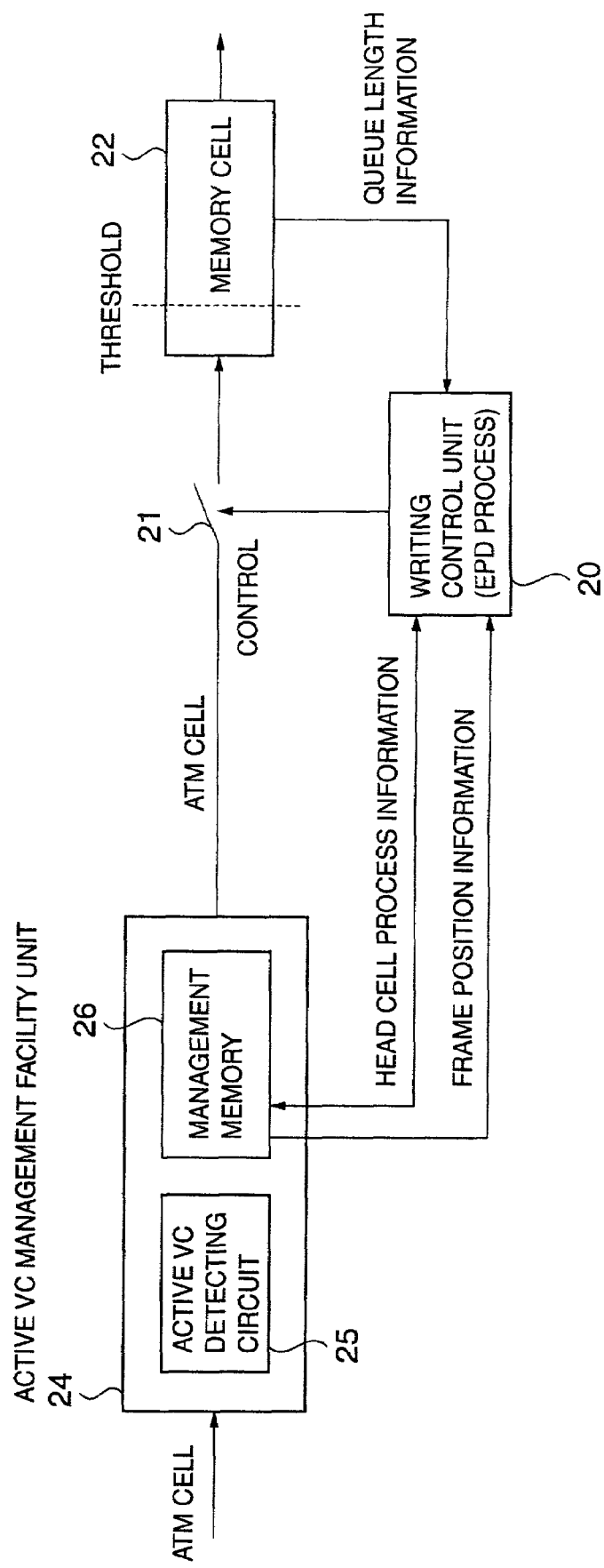
FIG. 4 is a block diagram of the first embodiment of an apparatus of the present invention.

FIG. 4 is a block diagram of the first embodiment of an apparatus of the present invention. In reference with the drawing, a writing control unit 20 turns off a selector 21, discarding a head cell and following cells of the same frame, if the head cell of the frame arrives while a queue size of a cell memory 22 is over a predetermined threshold. To the contrary, if the head cell of the frame arrives while the queue size of the cell memory 22 is smaller than the predetermined threshold, the selector 21 will be turned on, inputting the head cell and following cells of the same frame.

In the present invention, an active VC management facility unit 24 is provided, which allocates a management mechanism dynamically in accordance with detection of channels that are in communication (active VC) among infinite virtual channels, besides the above-mentioned writing control unit 20, the selector 21, and the cell memory 22. In the active VC management facility unit 24, an active VC detection circuit 25 (detection unit) that detects whether a virtual channel is active is provided, and, further, a management memory 26 (management memory unit) that stores frame management information indicative of whether it is in the middle or at the head of a frame for each virtual channel is provided. However, setting up a VPI/VCI (identifier of a virtual channel) as an entry is not performed by a control system, but setting up is performed automatically in reference to an inputted cell header (dynamic virtual channel management).

Figure 5:
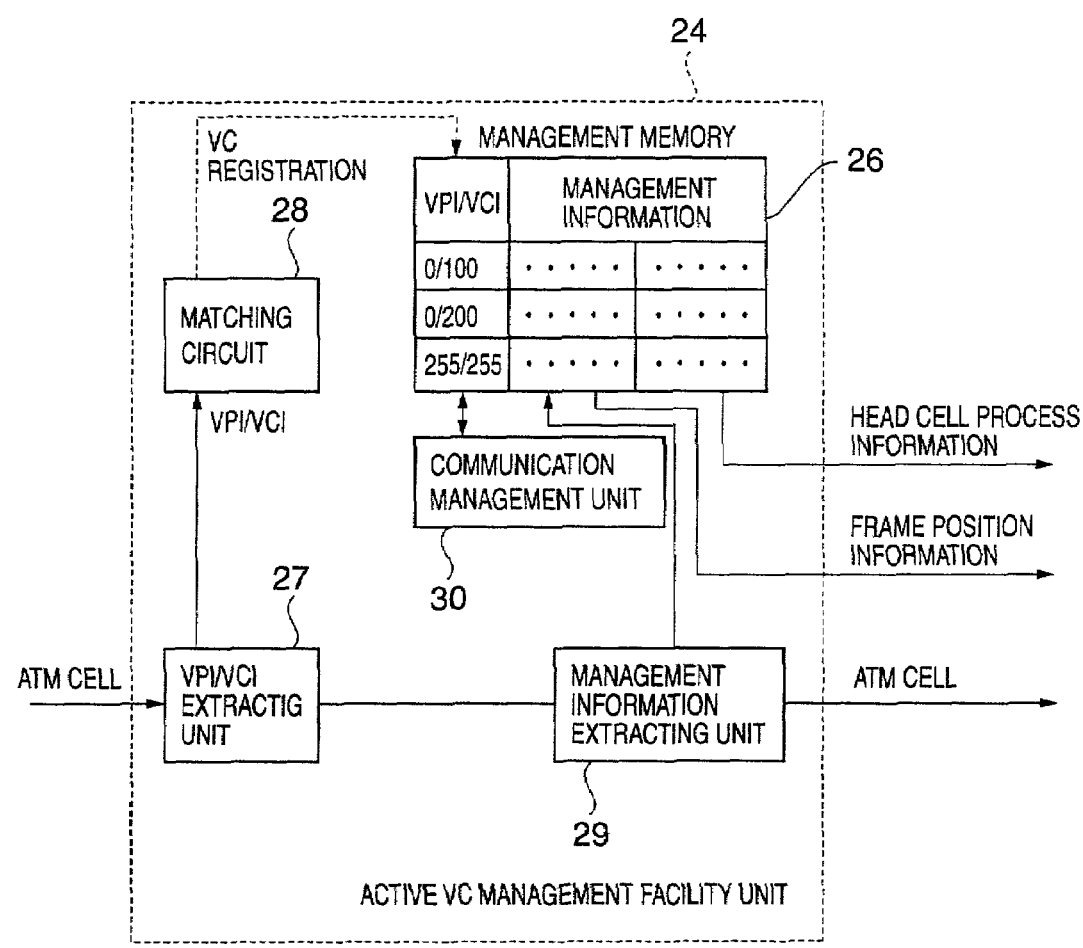
FIG. 5 is a block diagram of a specific active VC management facility unit 24.
Figure 6:
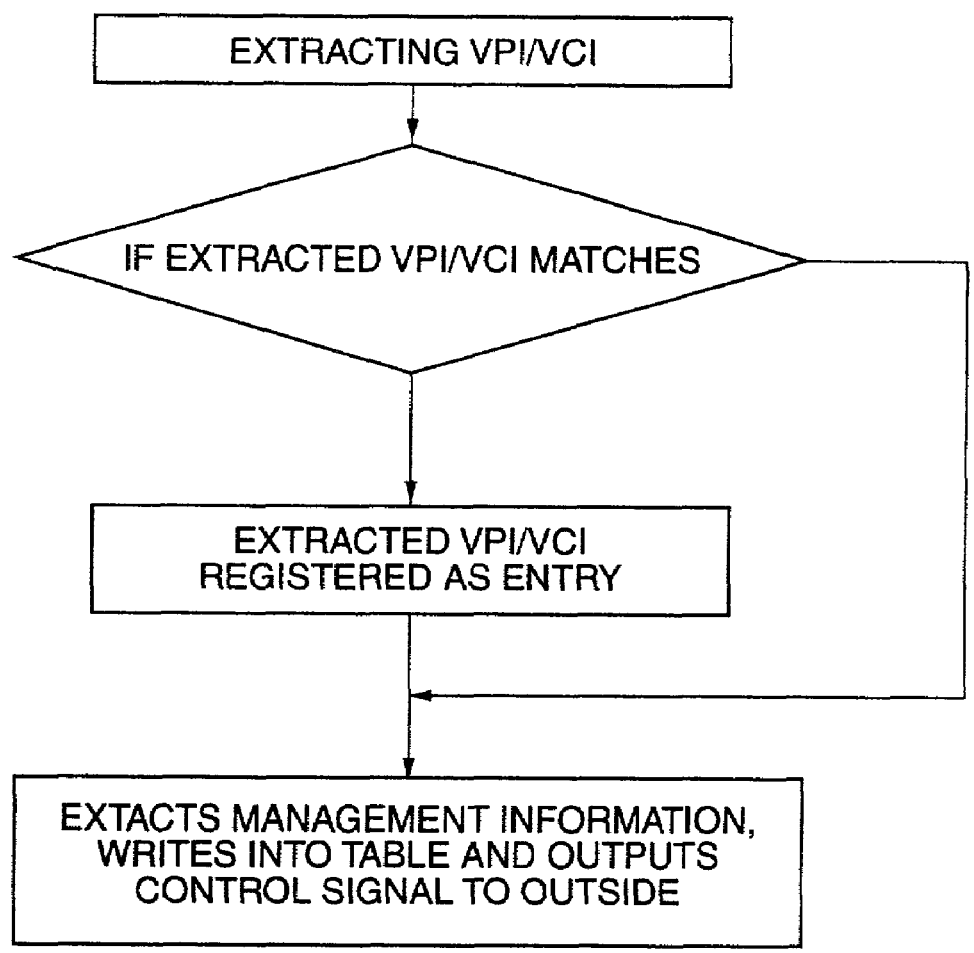
FIG. 6 is an operation flowchart of the active VC management facility unit 24.

A block diagram of a specific active VC management facility unit 24 is given in FIG. 5, and an operation flowchart of the active VC management facility unit 24 is given in FIG. 6. That is, if only virtual channels that are actually communicating are set up in a management table (management memory 26), it is not necessary to prepare a large management table, while scalability is secured.

In FIG. 5, as an active virtual channel detecting function, a matching circuit 28 (first registration unit) compares a VPI/VCI extracted from an ATM cell which arrives at a VPI/VCI extraction unit 27 with VPI/VCIs registered as entries in the management memory 26. If there is no match, the extracted VPI/VCI will be registered into the management memory 26 as an entry.

If there is a match, indicating prior registration, a control signal is outputted to outside, while management information is extracted by a management information extraction unit 29, and written into the management memory 26, or read from the management memory 26 and written into a cell and the like. Here, the management information is, for example, a piece of information indicative of "end of frame or not" in a PTI bit of a cell header.

In this manner, only virtual channels that are currently communicating are automatically managed by registering a virtual channel that is not in the management memory 26 when it arrives. In addition, a communication management unit 30 shown in FIG. 5 is supervising whether a registered virtual channel is active, and if the virtual channel is determined not to be active any longer, it is automatically deleted from the entry.

Depending on contents of frame processing, a case may arise where many kinds of information should be managed for each virtual channel. Efficiency may be deteriorated if the management memory 26 should be referred to every time. In such a case, as shown in FIG. 7, a frame management table 34 that manages frame information and the like is separated from the management memory 26 that manages active virtual channels.

Figure 7:
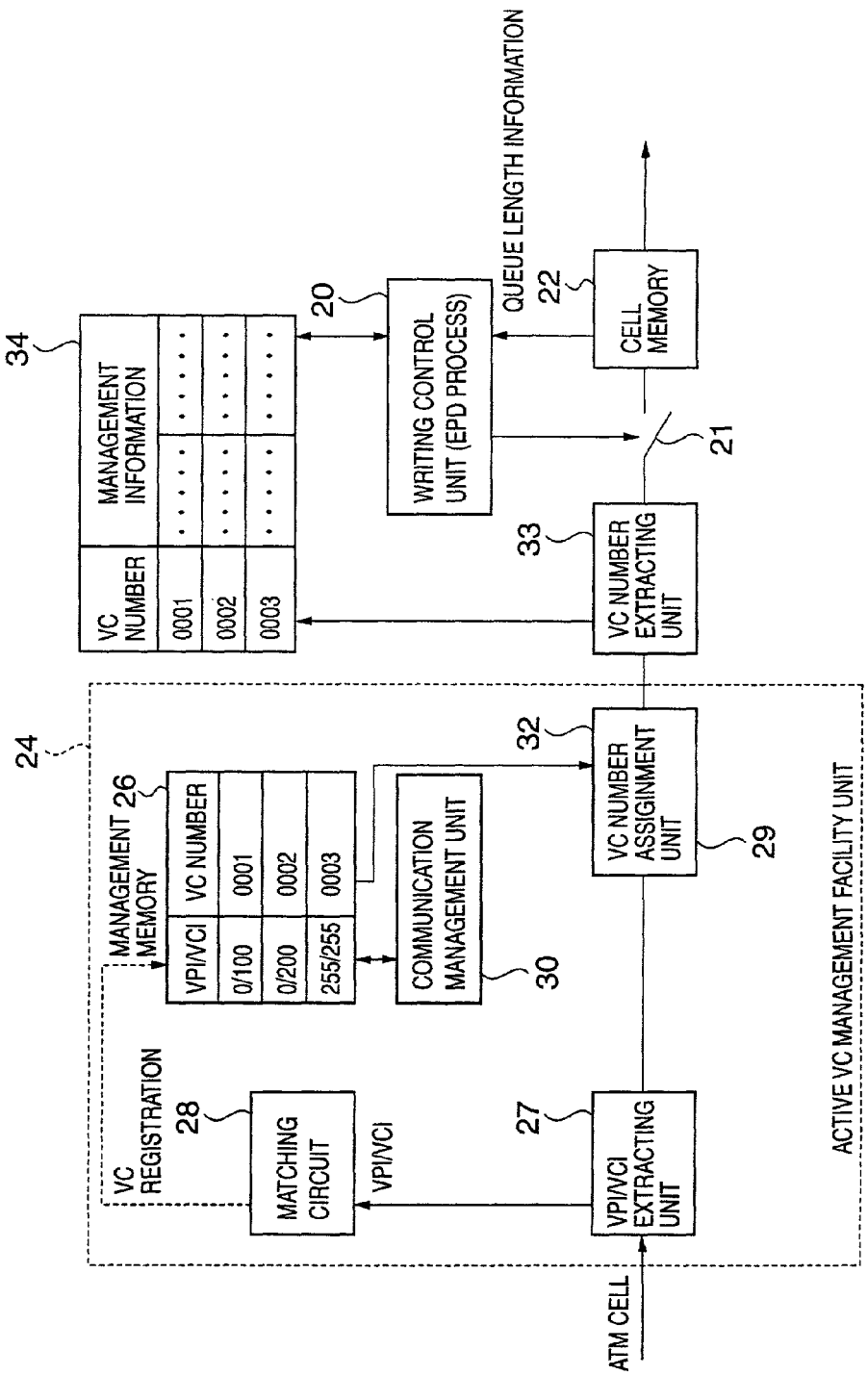
FIG. 7 is a block diagram of the second embodiment of an apparatus of the present invention.

FIG. 7 shows a block diagram of the second embodiment of an apparatus of the present invention. In this drawing, the management memory 26 (translation table unit) manages a "VC number" that manages an active virtual channel from inside such that one VC number corresponds to one VPI/VCI, and this VC number is given to a cell by a VC number assigning unit 32 (internal management number writing unit). The VC number extracted from the cell in a cascading VC number extraction unit (internal management number read-out unit) 33 is registered into a frame management table 34 (frame management table unit). Further, frame processing of EPD and the like are performed with reference to this table.

Figure 8:
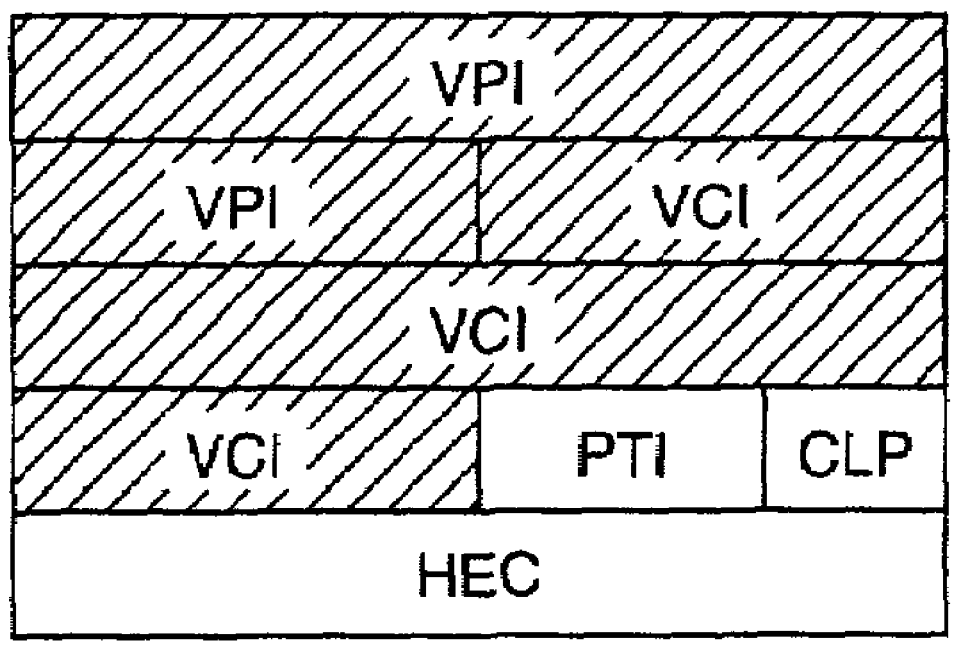
FIG. 8 shows a configuration of an ATM cell header.

In the above-mentioned embodiment, it was described that a VC number was assigned. Specifically, the VC number is written into a cell header so that the active VC management facility unit 24 provides the information to a frame management table in a later stage. If VPI/VCI is used as an entry for the management and control of connections, an enormous address space defined by 28 bits becomes necessary, so that the size of an address space needs to be reduced to a manageable level, and an address within such a reduced address space is used as a VC number for the purpose of management and control of connections. FIG. 8 shows a configuration of an ATM cell header. Because the VPI/VCI fields shown by hatched areas are reproducible by a reverse referencing (by VC number) to the management memory 26 of FIG. 7, these areas can be used for internal processing, for example, and VC numbers are written in the areas.

Figure 9:
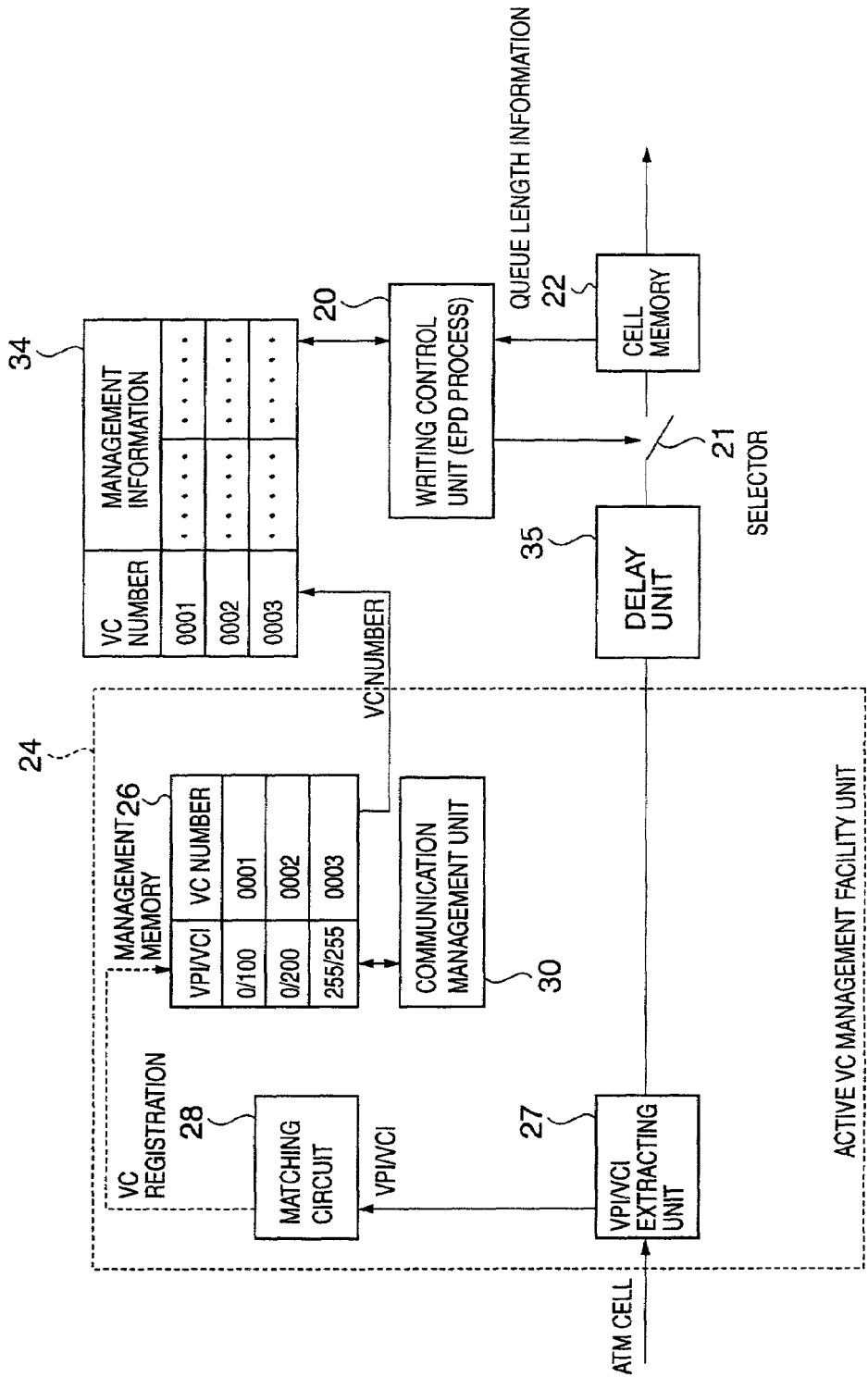
FIG. 9 is a block diagram of the third embodiment of an apparatus of the present invention.
Figure 10:
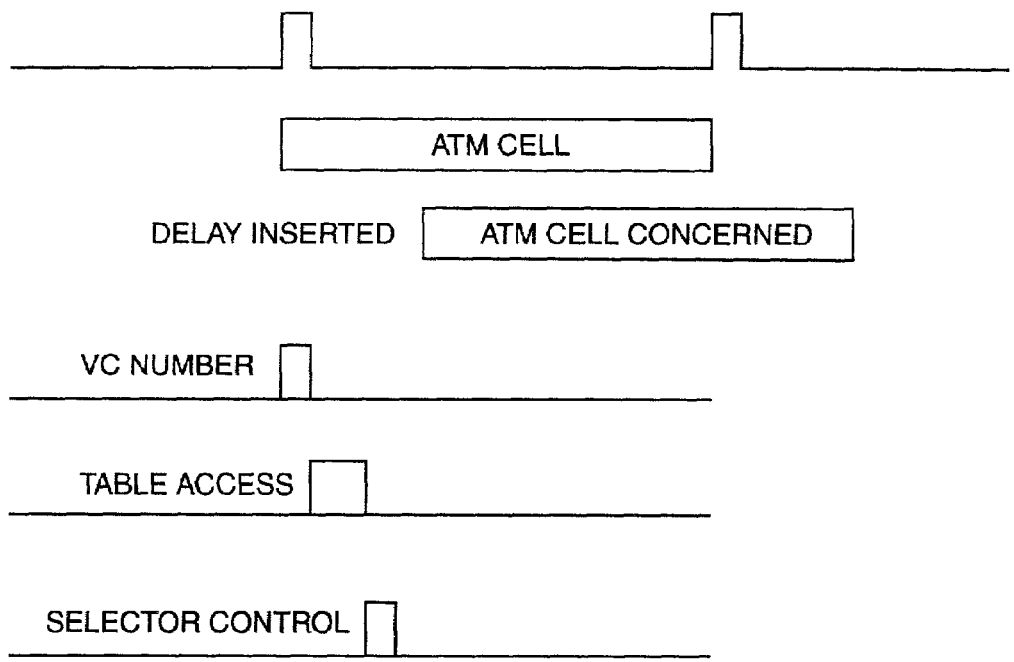
FIG. 10 is a timing diagram of the third embodiment of the apparatus of the present invention.

Moreover, a method of VC number assignment can be structured such that a VC number is transmitted to the frame management table 34 from the management memory 24 as data in parallel with ATM cell data as shown in the block diagram of the third embodiment of an apparatus of the present invention of FIG. 9. In addition, although the VC number synchronizes with the ATM cell, as shown in the timing diagram of FIG. 10, the selector 21 of writing control operates correctly by giving a delay to the ATM cell in a delay unit 35, the delay being equivalent to a writing process of the VC number into the frame management table 34 by the control unit 20.

In the embodiment of FIG. 5, new arrivals of VPI/VCI are registered into the management memory 26 and inactive virtual channels are deleted from the management memory 26 by a communication management unit 30. A description will follow about a method to manage virtual channels by a timer included in configuration of the communication management unit 30.

Figure 11:
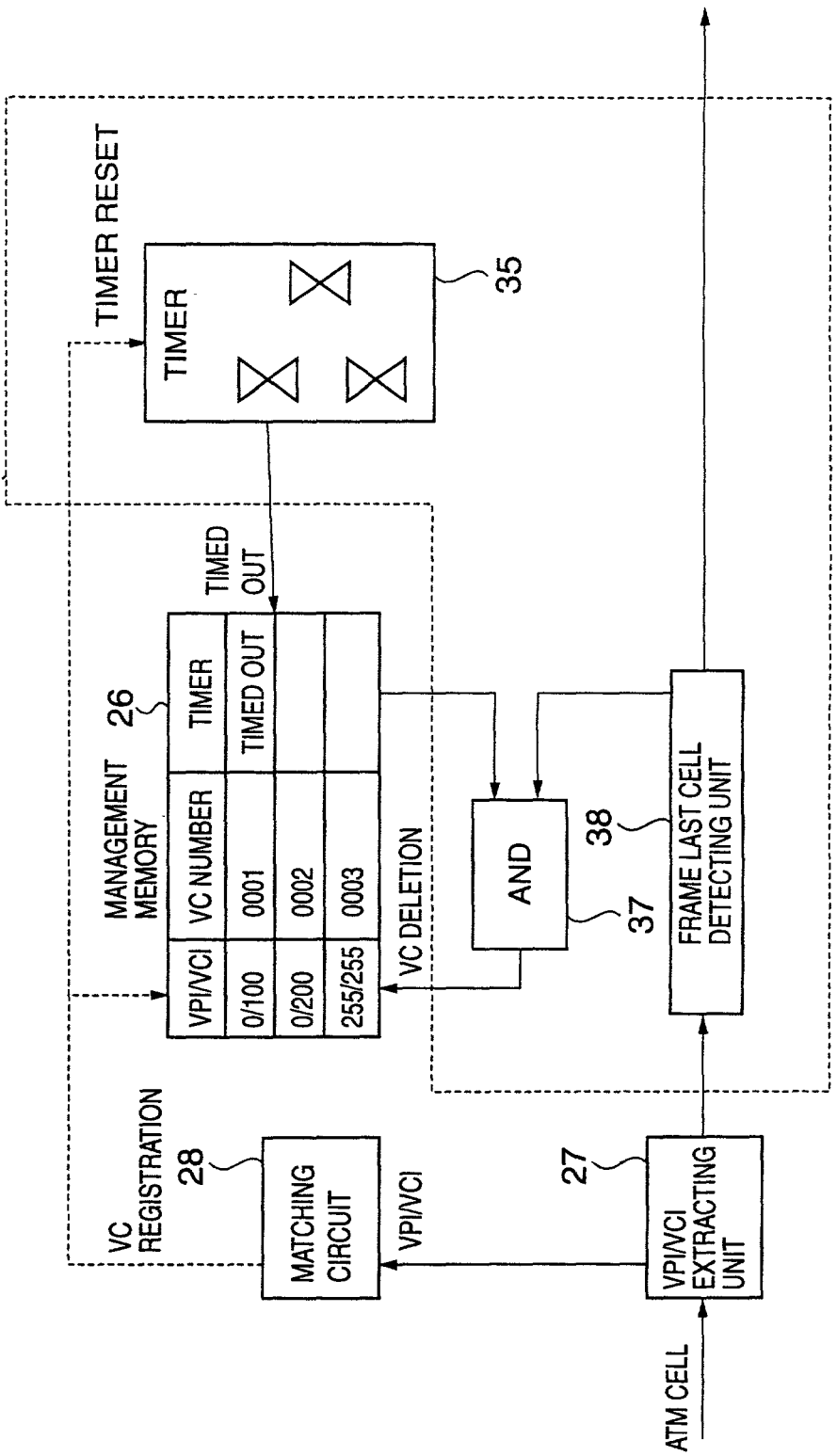
FIG. 11 shows a processing flow in a generating process of a memory management table.
Figure 12:
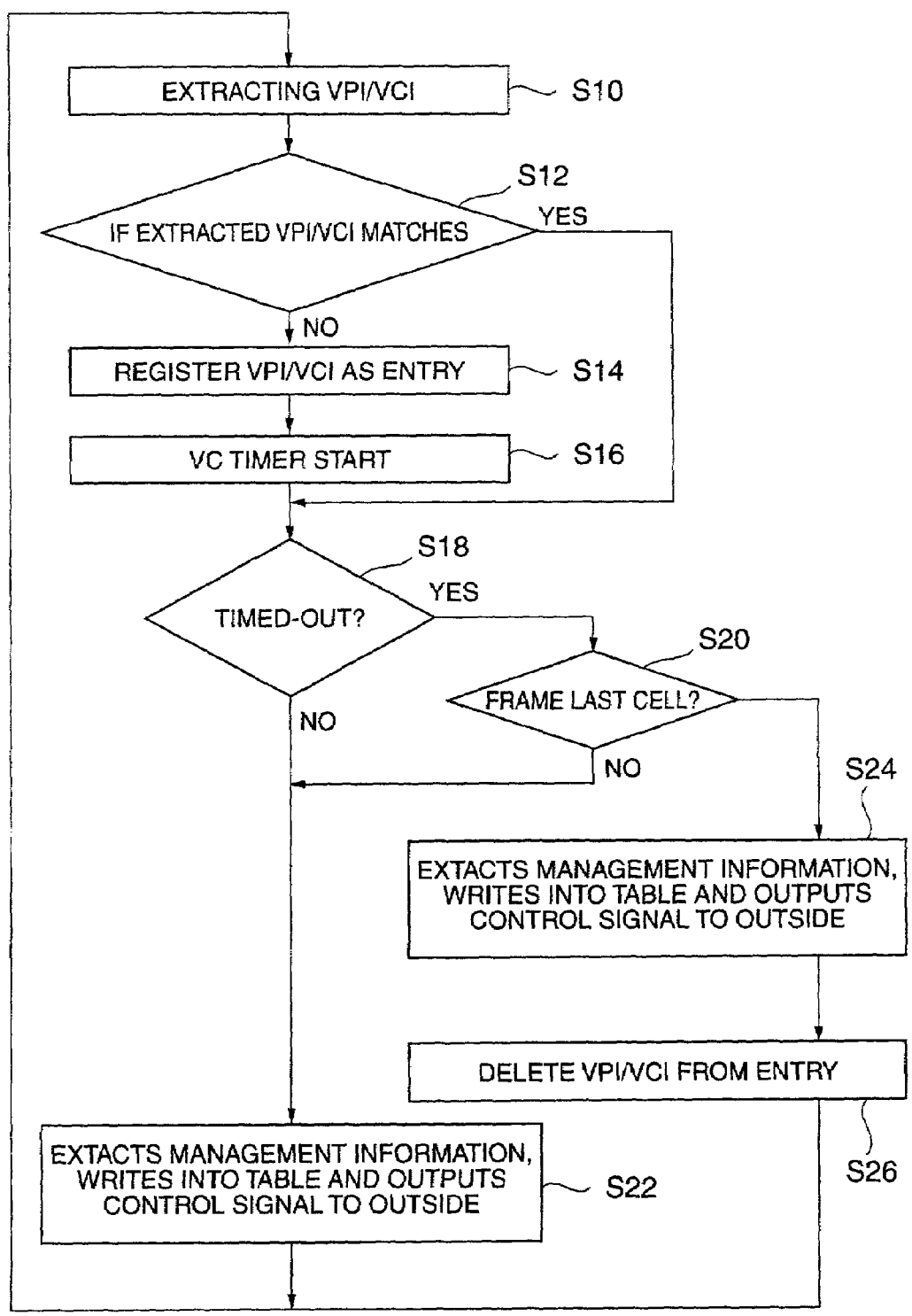
FIG. 12 is a block diagram of the fourth embodiment of an apparatus of the present invention.

FIG. 11 is a block diagram of the fourth embodiment of an apparatus of the present invention and FIG. 12 is an operation flow thereof. In reference with the drawing, a VPI/VCI is newly registered into the management memory 26 by the matching circuit 28, and at the same time, a timer 35 (timer unit) for each virtual channel is assigned to the virtual channel and started. Upon elapse of a predetermined time for time out, a time-out will be written into the management memory 26 for every virtual channel. A frame-last-cell detecting unit 36 (third deletion unit) detects the last cell of a frame. Where a time-out is recorded in the management memory 26, if the last cell of a frame is detected, the fact thereof is supplied to the management memory 26 through an AND circuit 37 in the communication management unit 30, and an applicable VPI/VCI (virtual channel) will be deleted from the entry of the management memory 26. Generally, in one communication, frames are usually transmitted continuously. Where frames are transmitted continuously as described, the present embodiment requires a small number of entry registration/deletion events to/from the management memory 26, providing efficient processing.

In FIG. 12, a VPI/VCI of an arriving ATM cell is extracted at a step S10, and whether the VPI/VCI is registered into the management memory 26 is checked at a step S12. Only when it is not registered, the VPI/VCI is registered into the management memory 26 as an entry at a step S14. In a step S16 (timer start unit), a timer of the virtual channel that is registered is started.

Next, at steps S18 and 20, whether a time-out applies and whether a cell is the last cell of a frame are checked, respectively. If both the time-out and the frame-last-cell are affirmative, management information is extracted from the ATM cell and written into the table of the management memory 26, and a control signal is outputted to outside at a step S24. Furthermore, at a step S26 (first deletion unit), the VPI/VCI (virtual channel) is deleted from the entry of the management memory 26. On the other hand, if conditions are not satisfied at the steps S18 or 20, the management information is extracted from the ATM cell, and written into the table of the management memory 26, and a control signal is outputted to outside at a step S22.

Figure 13:
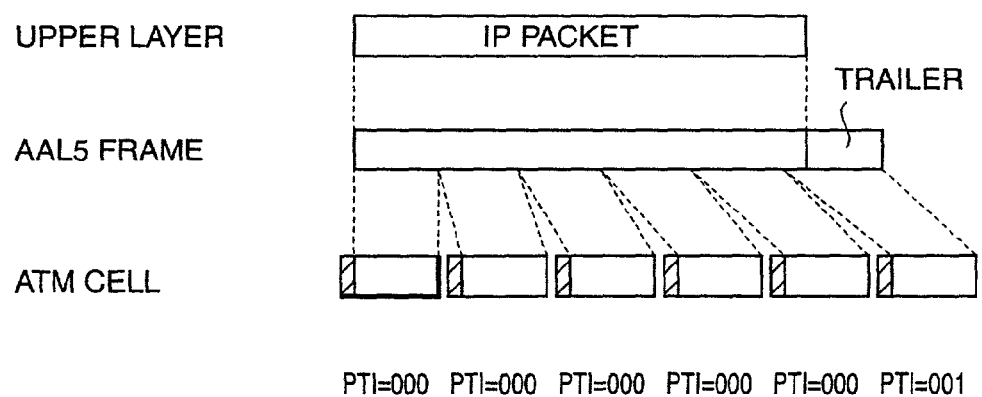
FIG. 13 is an operation flowchart of the fourth embodiment of the apparatus of the present invention.

By the way, in an ATM cell, a head, the last and the like of a frame can be checked by referring to a PTI bit in a cell header as shown in FIG. 8. That is, when a higher layer frame, such as an IP packet, is formed into the ATM cell by a method of AAL5 (AAL: ATM Adaptation Layer), as shown in FIG. 13, the cell is recognized to be the end of a frame by writing 001 (or 011) in the PTI bit of the cell at the tail end of the frame. The PTI bit of a head cell and intermediate cells of a frame is set to 000 (or 010). If the end of a frame is known, recognition of a start also becomes possible because the cell, which comes, next will be a head of a frame.

Figure 14:
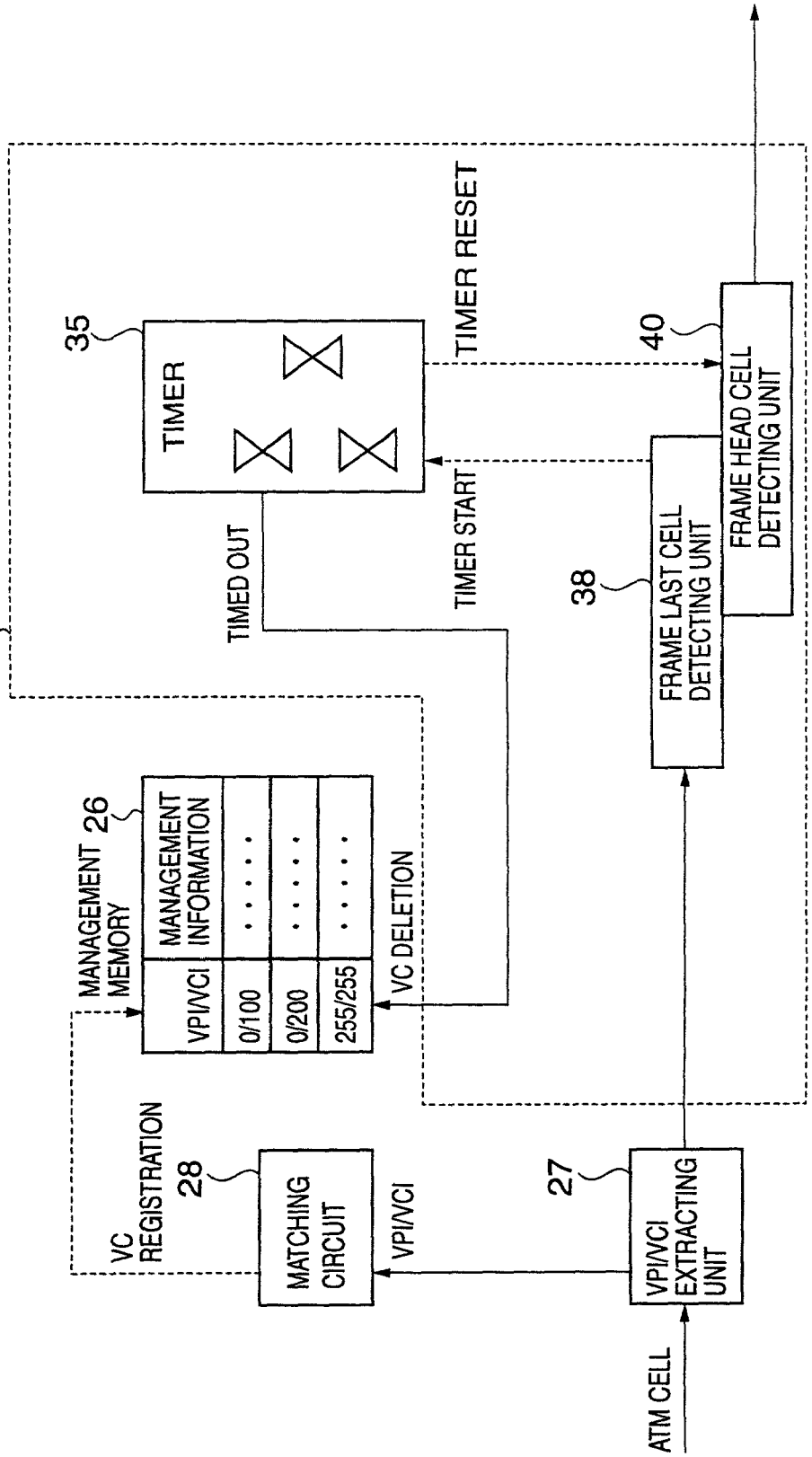
FIG. 14 is a block diagram of the fifth embodiment of an apparatus of the present invention.
Figure 15:
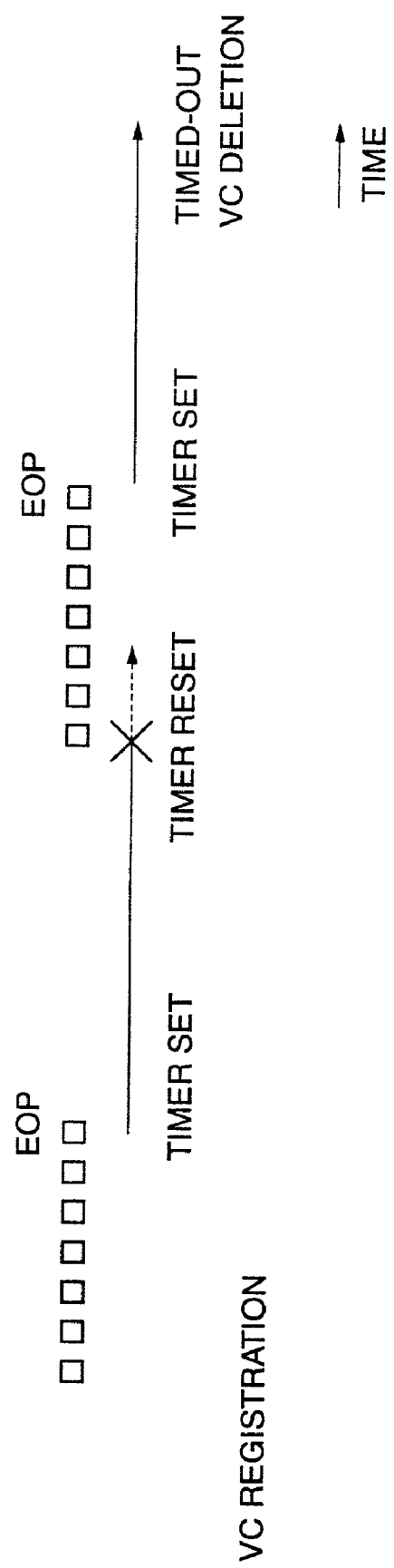
FIG. 15 is an operation flowchart of the fifth embodiment of the apparatus of the present invention.

FIG. 14 shows a block diagram of the fifth embodiment of an apparatus of the present invention and FIG. 15 shows an operation diagram thereof. This embodiment is different from the previous embodiment in the timing of the timer start and reset. In FIG. 14, a timer (timer unit) 38 is started for every virtual channel when the last cell of a frame was detected by a frame-last-cell detecting unit 39 (timer start unit) in a communication management unit 30. Before the time-out occurs, when the head cell of the frame of the same virtual channel is detected by the frame-head-cell detecting unit 40 (second deletion unit), the timer 38 of this virtual channel will be reset. Further, the VPI/VCI (virtual channel) that corresponds to the timed-out timer 38 is deleted from the entry of the management memory 26.

Figure 16:
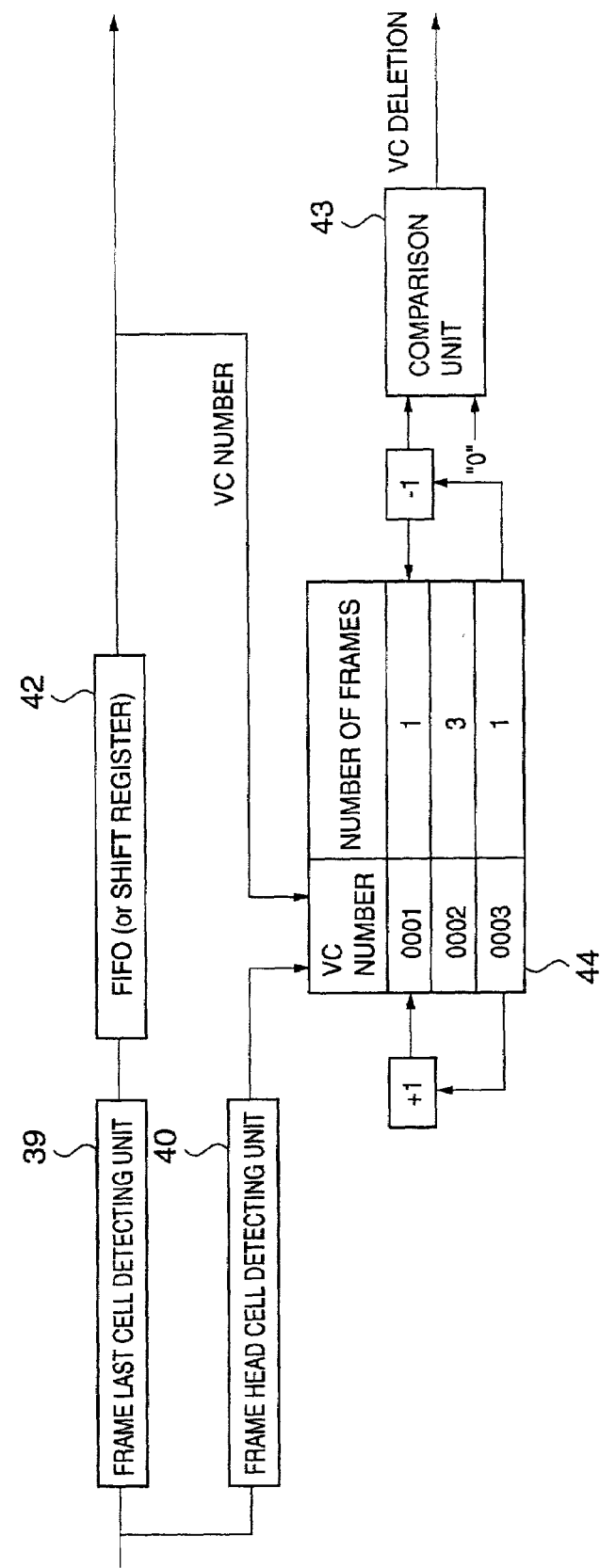
FIG. 16 is a block diagram of a timer of the sixth embodiment of an apparatus of the present invention.
Figure 17:
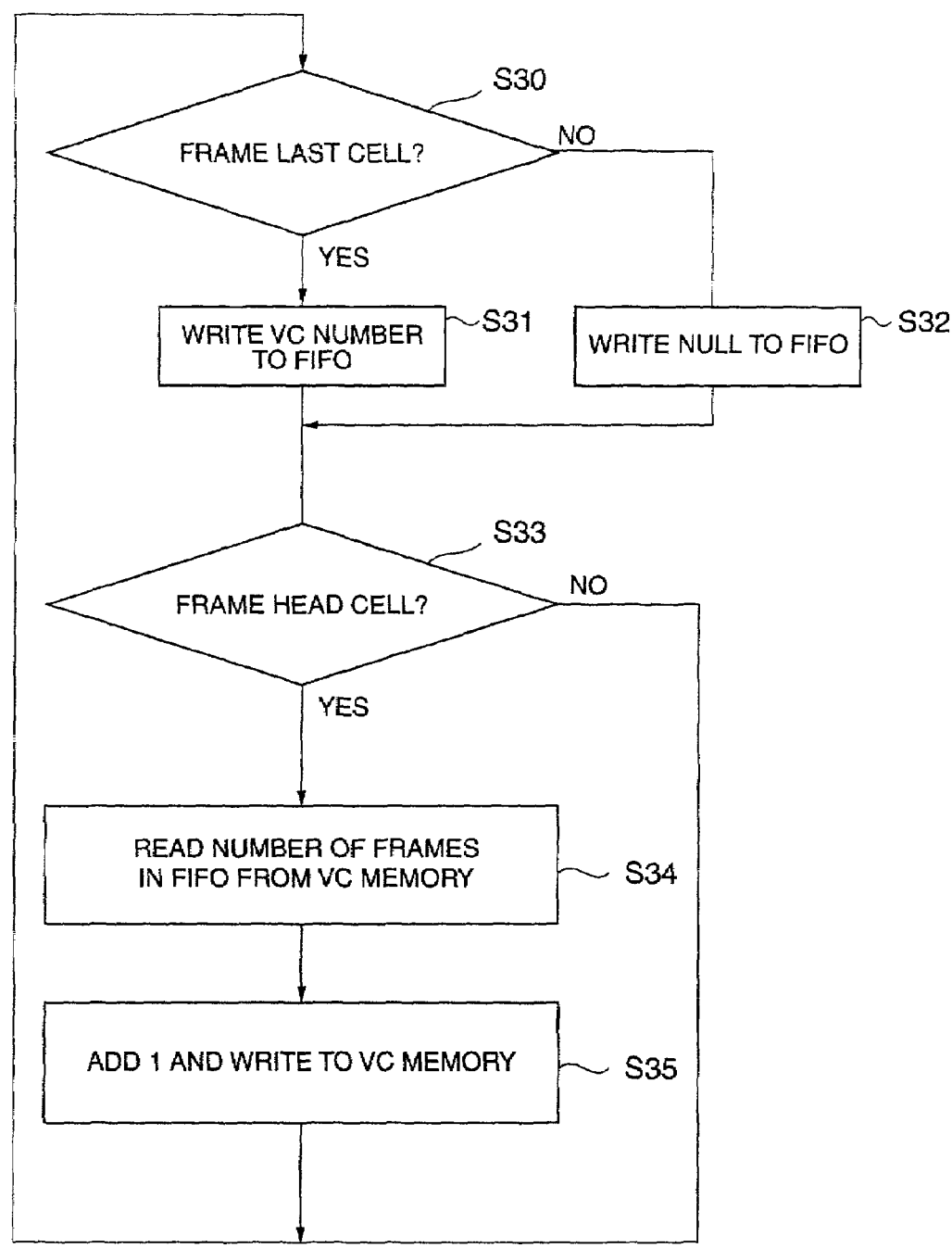
FIG. 17 is a flowchart of a FIFO writing process.
Figure 18:
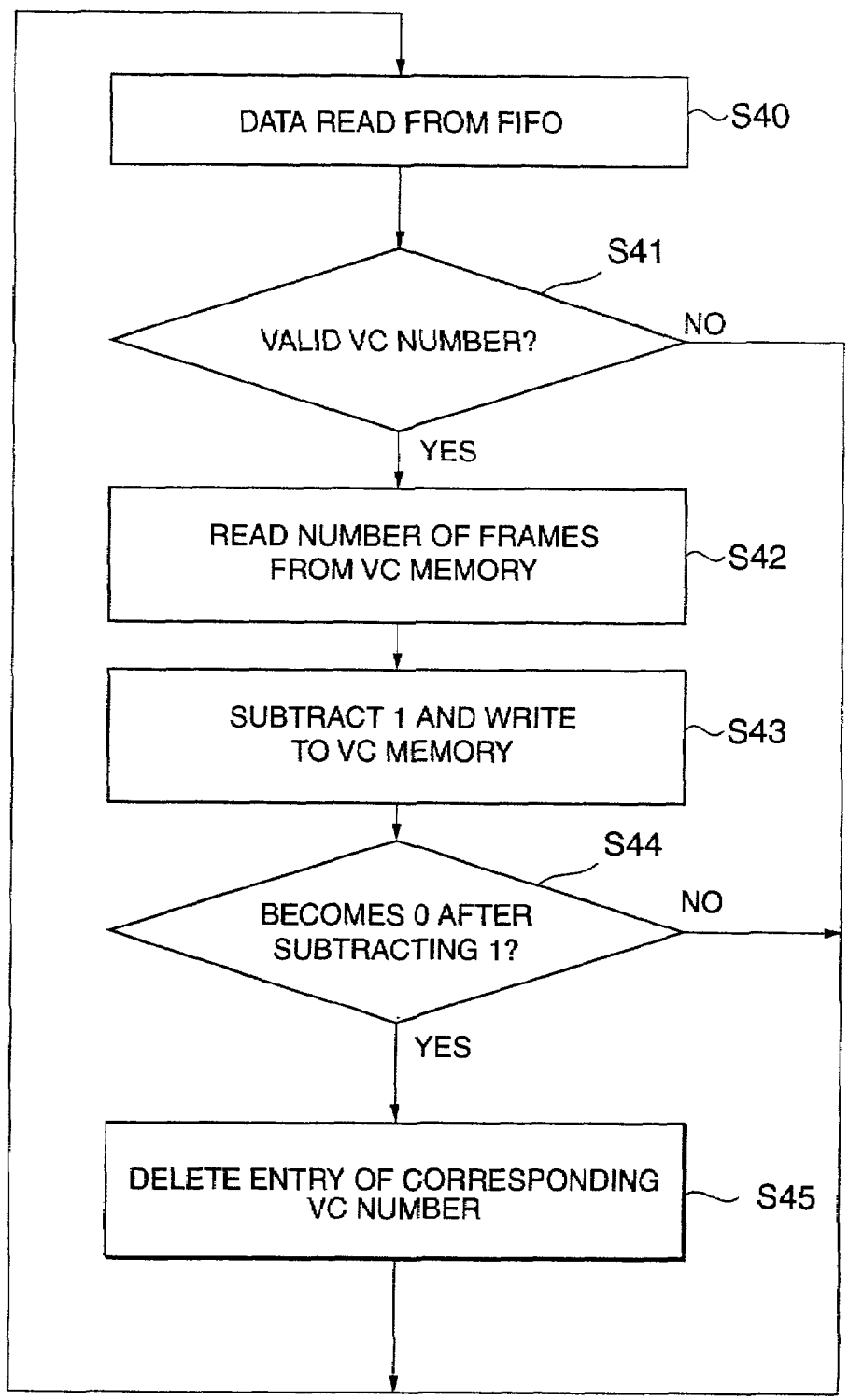
FIG. 18 is a flowchart of a FIFO reading process.

FIG. 16 shows a block diagram of a timer of the sixth embodiment of an apparatus of the present invention. FIG. 17 is a flowchart of FIFO writing process, and FIG. 18 is a flowchart of FIFO read-out process. This embodiment structures the timer by a FIFO (or shift register).

In FIG. 16, when the last cell of a frame is detected by the frame-last-cell detecting unit 39, an ID (VPI/VCI or VC number) of the frame is written into a FIFO 42. Moreover, when the last cell does not arrive, a null (blank) code is written in so that writing is always performed for each cell. Further, reading at the FIFO 42 is always performed for each cell, and if an ID of a certain virtual channel is read by the FIFO 42, the virtual channel is deleted, namely, the size (number of stages) of the FIFO 42 is equivalent to a timer, and being read from FIFO 42 is equivalent to a time-out.

Moreover, since there can be a case where a following frame arrives and the timer is reset before carrying out the time-out, a VC memory 44 is provided to memorize an ID and the number of frames of a virtual channel that is memorized in the FIFO 42. When the head cell of the frame of a virtual channel is detected by the frame-head-cell detecting unit 40, 1 is added to the number of frames of the corresponding virtual channel in the VC memory 44. Moreover, whenever reading from FIFO 42 occurs, 1 is subtracted from the number of frames of the virtual channel. If a comparison unit 43 determines that this value (the number of frames in the FIFO 42) is 0, it signifies that the FIFO 42 does not contain information on a virtual channel, and the timer is not reset, therefore, the virtual channel can be deleted. If the value of the VC memory 44 is not 0, even after reading-out from the FIFO 42 and 1 is subtracted, it signifies that the timer has been reset and the virtual channel is not deleted. In addition, a shift register may be used instead of the FIFO 42.

In reference with FIG. 17, whether an ATM cell that arrives at a step S30 is the last cell of a frame is checked. If it is the last cell, a VC number will be written in the FIFO 42, and if it is not the last cell, a null code will be written in the FIFO 42. Next, at a step S33, whether this cell is a head cell of a frame is checked. If it is a head, the corresponding number of frames is read from the VC memory 44 at a step S34. In a step S35, 1 is added to this number of frames, which is written into the VC memory 44, and the process advances to the step S30. On the other hand, if it is not a head, the process goes to the step S30 as it is.

In FIG. 18, at a step S40, data is read from the FIFO 42 cell by cell, and whether this data is a valid VC number is checked at a step S41, and if it is not valid, the process will progress to the step S40. On the other hand, if it is valid, the process will progress to a step S42, and the number of frames of the VC number corresponding to this data is read from the VC memory 44, 1 is subtracted from this number of frames, and written into the VC memory 44 at a step S43. Next, at a step S44, whether the above-mentioned subtraction result has gotten to 0 is checked, and only when it is 0, the entry corresponding to the VC number is deleted from the VC memory 44 at a step S45, and the process advances to a step S40.

Figure 19:
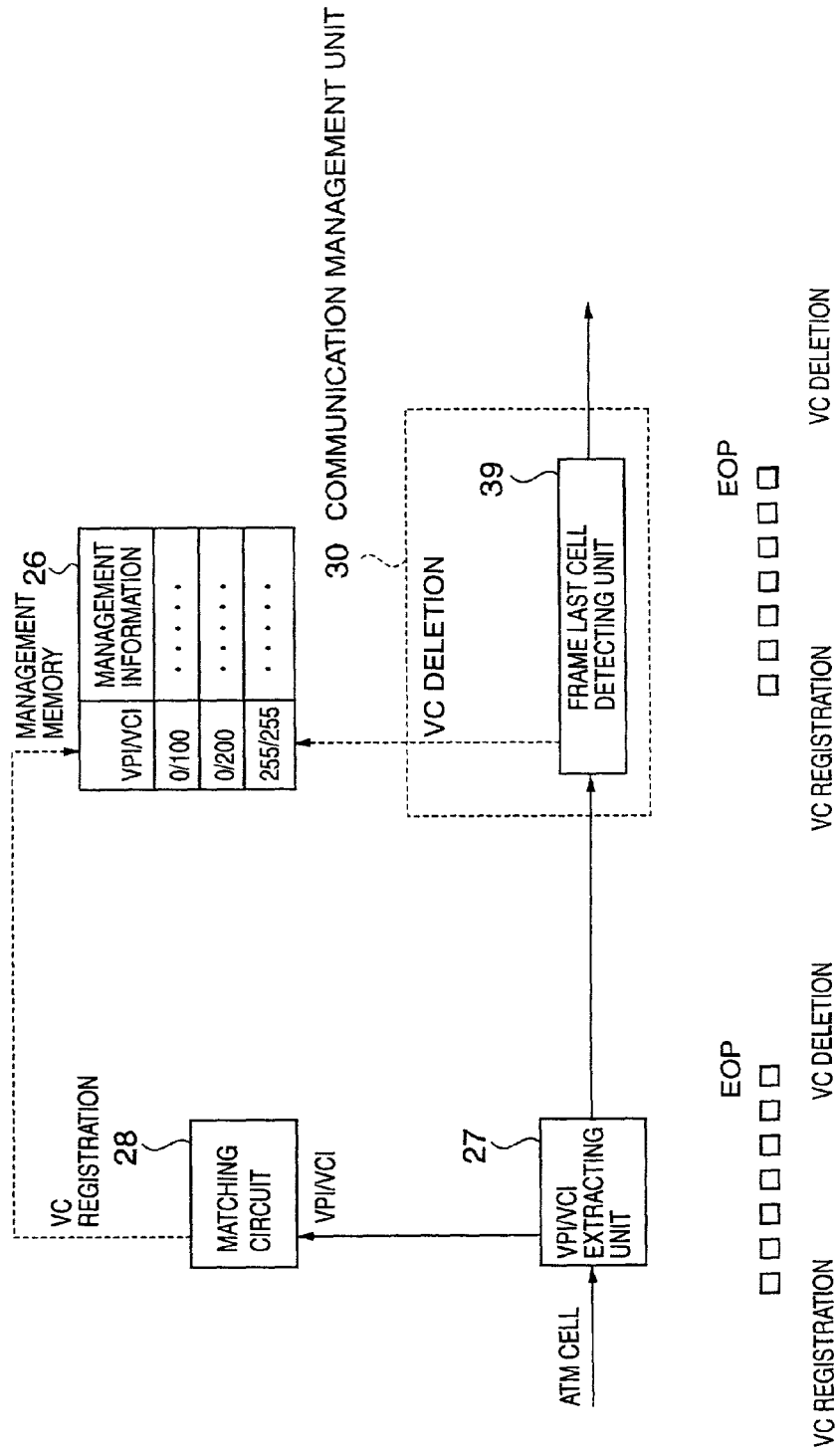
FIG. 19 shows a configuration and operational description of the seventh embodiment of an apparatus of the present invention.

FIGS. 19(A) and (B) are a block diagram and an operation description of the seventh embodiment of an apparatus of the present invention. In this embodiment, there is no timer. Deleting a virtual channel from an entry each time takes place upon arrival of the last cell of a frame. In FIG. 19, when the last cell of a frame is detected by the frame-last-cell detecting unit 39 in the communication management unit 30, a corresponding VPI/VCI (virtual channel) is deleted from the entry of the management memory 26. In addition, when a match was not obtained in the matching circuit 28, a VPI/VCI extracted from the ATM cell is registered into the management memory 26 as an entry as previously described.

Figure 20:
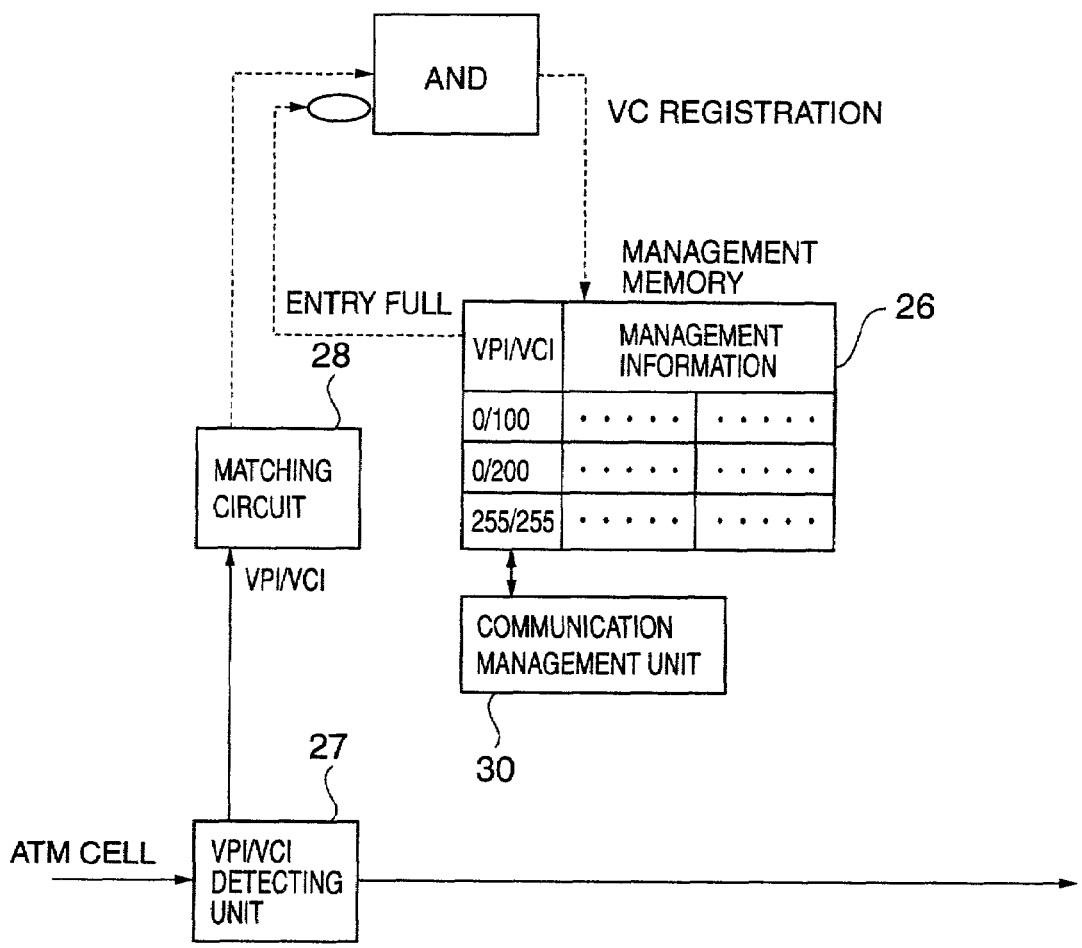
FIG. 20 is a block diagram of the ninth embodiment of an apparatus of the present invention.

FIG. 20 is a block diagram of the ninth embodiment of an apparatus of the present invention. This embodiment also specifies an operation when the entry of management memory 26 is full. In FIG. 20, if a signal indicative of an entry being full (full) is received from the management memory 26 when there is a demand from the matching circuit 28 to register a new entry about the VPI/VCI extracted from the ATM cell into the management memory 26, an AND circuit 45 (registration disapproval unit) will supply a control signal to the management memory 26, prohibiting the entry registration into the management memory 26. In this manner, when the entry of the management memory 26 is not full, that is, only when there is a margin in the entry, the new VPI/VCI is registered as an entry to the management memory 26.

Figure 21:
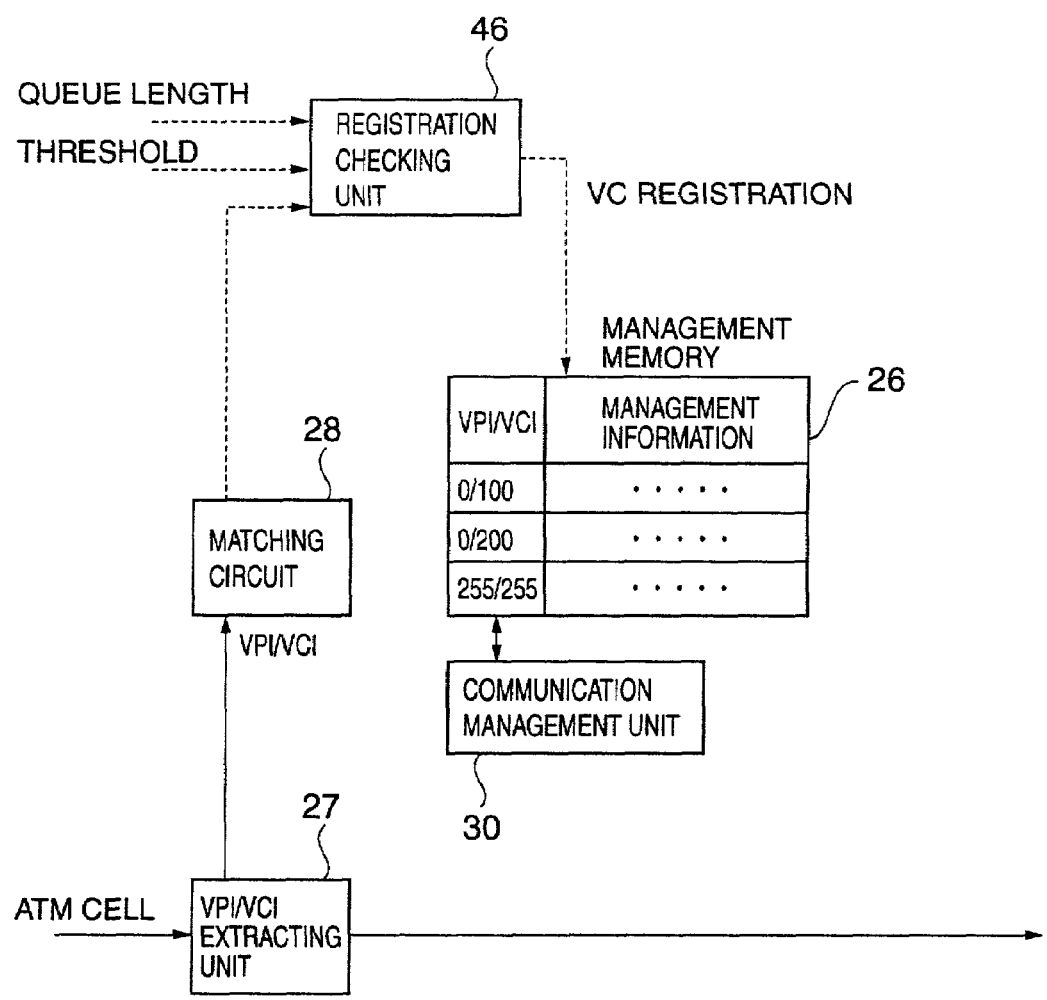
FIG. 21 is a block diagram of the 10th embodiment of an apparatus of the present invention.

FIG. 21 is a block diagram of the 10th embodiment of an apparatus of the present invention. In FIG. 21, a demand to register a new entry from the matching circuit 28 into the management memory 26 for a VPI/VCI extracted from an ATM cell is supplied to the registration checking unit 46 (first registration checking unit). The queue size (cell holding capacity) and a threshold N1 of the cell memory 22 are supplied to the registration checking unit 46. When the queue size is sufficiently larger than the threshold N1, frame processing, such as EPD and the like, is not necessary. Therefore, when (threshold N1-queue size) exceeds a predetermined value K, the registration checking unit 46 dismisses the above-mentioned registration demand, and does not perform registration to the management memory 26. Moreover, when (threshold N1-queue size) is below the predetermined value K, it permits the registration checking unit 46 to register a new entry into the management memory 26.

Figure 22:
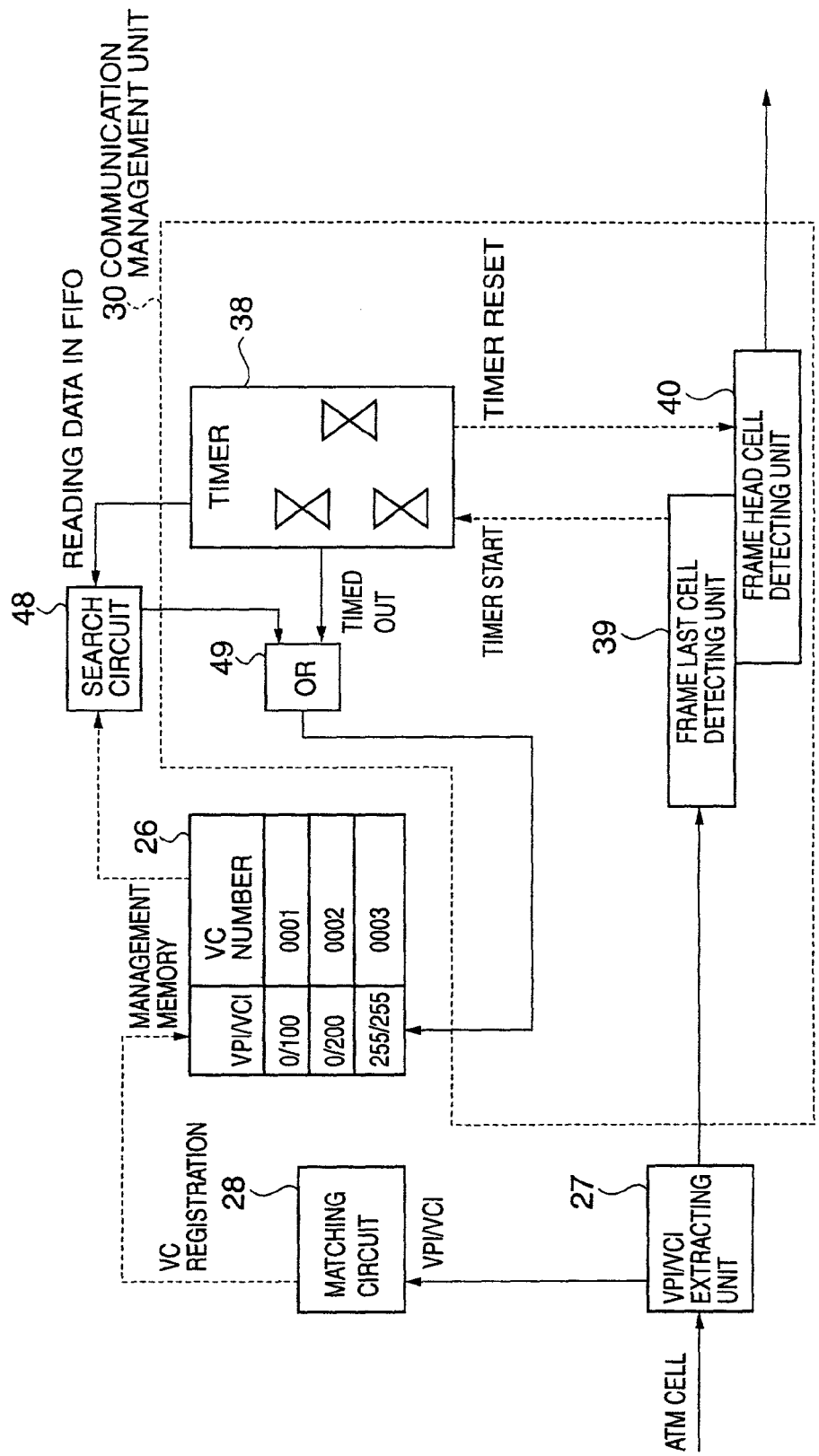
FIG. 22 is a block diagram of the 11th embodiment of an apparatus of the present invention.

FIG. 22 is a block diagram of the 11th embodiment of an apparatus of the present invention. In this embodiment, a timer deletes an entry near a time-out and registers a new entry, when the entry of the management memory 26 is full.

In FIG. 22, when the entry of the management memory 26 is full, a signal indicative of the entry being full is supplied to a search circuit 48. Here, in the communication management unit 30, the timer 38 is started on a virtual-channel-by-virtual-channel basis when the last cell of a frame was detected by the frame-last-cell detecting unit 39, and the timer 38 of a virtual channel is reset when the head cell of the frame of the same virtual channel is detected by the frame-head-cell detecting unit 40 before the time-out. Further, the VPI/VCI (virtual channel) that corresponds to the time-out of the timer 38 is deleted from the entry of the management memory 26. The above-mentioned communication management unit 30 and the search circuit 48 correspond to the fourth deletion unit given in a claim.

Upon receipt of a signal indicative of the entry being full, the search circuit 48 reads contents of the timer 38 and searches a virtual channel that has the nearest time-out when a signal indicative of the entry being full is received.

When a demand to register into the management memory 26 is supplied for a new entry of an VPI/VCI extracted from the ATM cell from the matching circuit 28 to the management memory 26, a direction to delete the virtual channel searched by the search circuit 48 through an OR circuit 49 in the communication management unit 30 is supplied to the management memory 26, this virtual channel is deleted from the entry of the management memory 26, and the new entry from the matching circuit 28 is registered into the management memory 26.

In addition, when the timer 38 is structured by the FIFO 42 as shown in FIG. 16, data (VC number) nearest to a read pointer of the FIFO 42 becomes the virtual channel nearest to the time-out. The search circuit 48 starts searching from the read pointer by using the entry full information as a trigger, and searches for data other than null in the FIFO 42. A VPI/VCI corresponding to the data (VC number) found in this manner is deleted from the management memory 26 upon the registration demand of a new entry.

Figure 23:
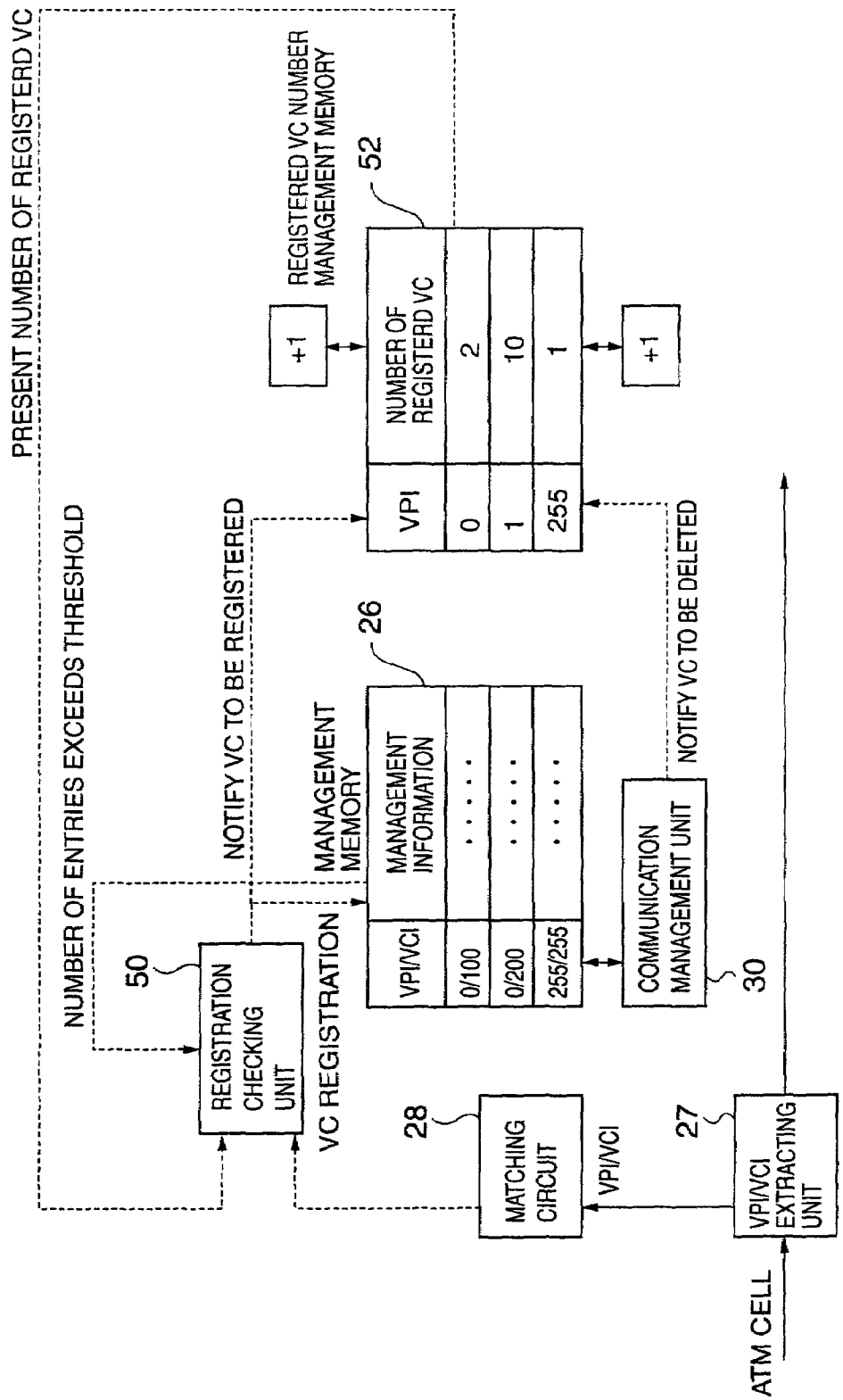
FIG. 23 is a block diagram of the 12th embodiment of an apparatus of the present invention.

FIG. 23 is a block diagram of the 12th embodiment of an apparatus of the present invention. This embodiment manages the number of VCs registered as an entry in the management memory 26 for each VP. Here, when making a service contract on a VP-basis, an impartial availability of VCs is obtained by prohibiting an entry registration of a new VC of a VP with the number of VCs exceeding a certain threshold N2, and permitting an entry registration of a new VC of a VP with the number of VCs not more than the threshold N2, where the number of entries registered in the management memory 26 is approaching full.

In FIG. 23, a demand from the matching circuit 28 to register a new entry into the management memory 26 for a VPI/VCI extracted from an ATM cell is supplied to a registration checking unit 50 (second registration checking unit). Here, a registered VC number management memory 52 (VC number counting unit) is provided to store the number of registered VCs (the number of VCs registered into the management memory 26) of every VP (VPI), in addition to the management memory 26 to store a VPI/VCI and its management information for each entry As for each number of registered VCs in the registered VC number management memory 52, a corresponding VP's registered VC number is incremented by one when a VC is registered in the management memory 26, and the corresponding VP's registered VC number is decremented by one when a VC is deleted from the management memory 26. Further, the management memory 26 sends a signal indicative of "almost full" to a registration checking unit 50, indicating that the number of entries has exceeded a threshold before the entry gets full.

When the registration checking unit 50 receives a registration demand from the matching circuit 28, if the "almost full" indication signal is supplied from the management memory 26, the number of registered VCs of a registration demanding VP is checked with reference to the registered VC number management memory 52. When this number of the registered VCs is over the threshold N2, the entry of a VPI/VCI of the above-mentioned registration demand is not registered into the management memory 26, but when this number of registered VCs is less than the threshold N2, the entry of the VPI/VCI of the above-mentioned registration demand is registered into the management memory 26.

A method using signaling information as a trigger of the registration/deletion in the virtual channel for the management memory 26 will be described. The signaling is for a procedure of setting up and releasing a connection dynamically. The signaling information (for example, VPI/VCI, a class of service, a traffic parameter, and the like) called information element as shown in an encapsulation procedure of a signaling message to the ATM cell in FIG. 25 is formed into an SSCOP (Service Specific Connection Oriented Protocol) frame, further formed into an AAL5 frame, and communicated between apparatuses.

Figure 25:
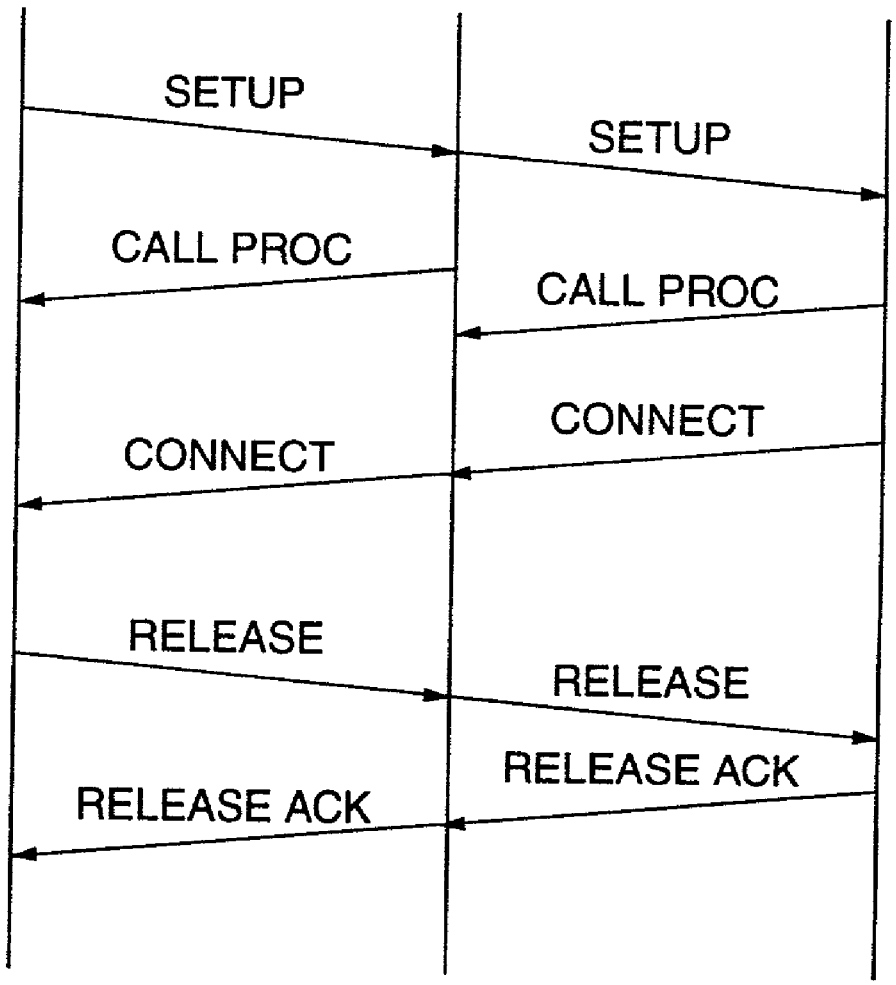
FIG. 25 shows a transfer sequence of the signaling message.

As shown in a-transfer sequence of the signaling message of FIG. 25, a SETUP message is transmitted as a connection setting request, and a CONNECT is returned as an acknowledgement signal. Here, CALLPROC is a signal indicative of "processing message at present" to inform a sender. A RELEASE is a connection-release request and RELEASE ACK is an acknowledgement signal thereto.

Figure 26:
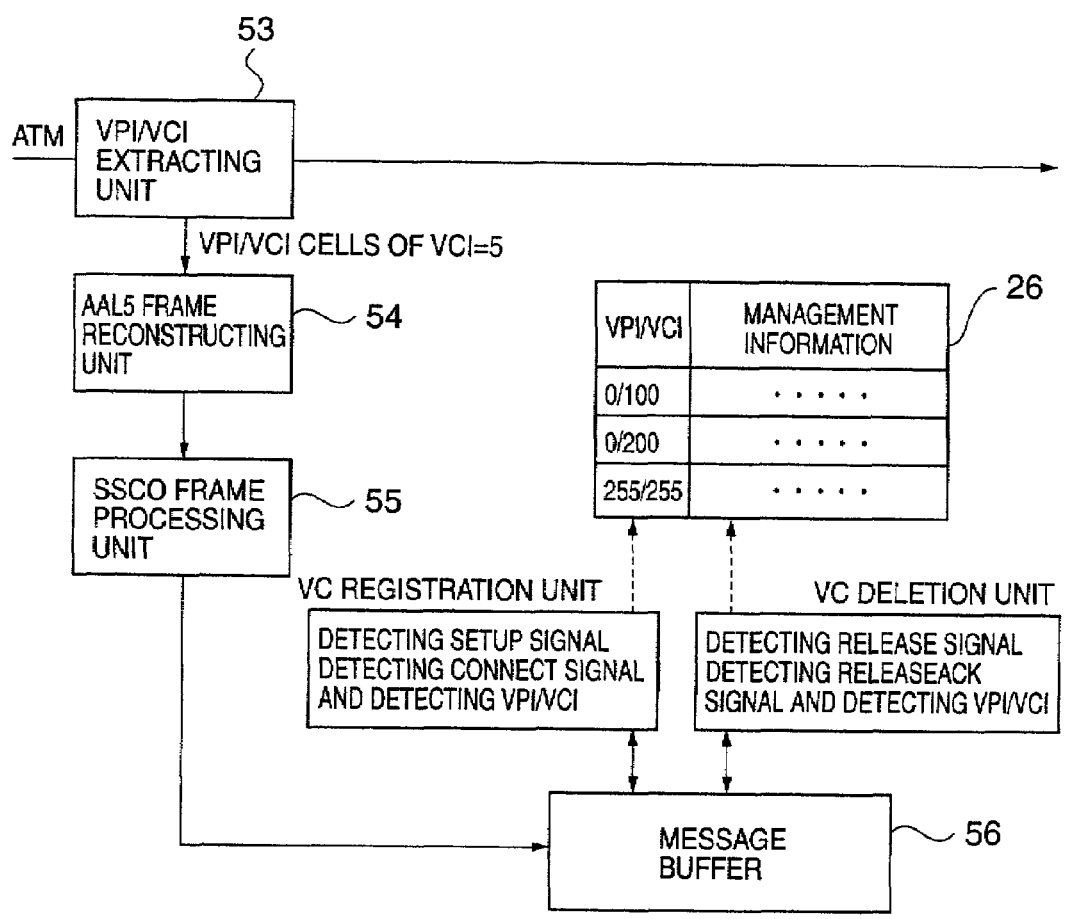
FIG. 26 is a block diagram of a signaling supervisory circuit of the 12th embodiment of an apparatus of the present invention.

FIG. 26 is a block diagram of a signaling supervisory circuit of the 12th embodiment of an apparatus of the present invention. In the drawing, a VPI/VCI extraction unit 53 (signaling extraction unit) extracts a cell of VCI=5 from an ATM cell that arrives and provides the cell to an AAL5 frame reconstruction unit 54. Here, the cell of VCI=5 represents a signaling cell. In the AAL5 reconstruction unit 54, an AAL5 frame is restructured as shown in FIG. 24, which is provided to an SSCOP frame processing unit 55.

Figure 24:
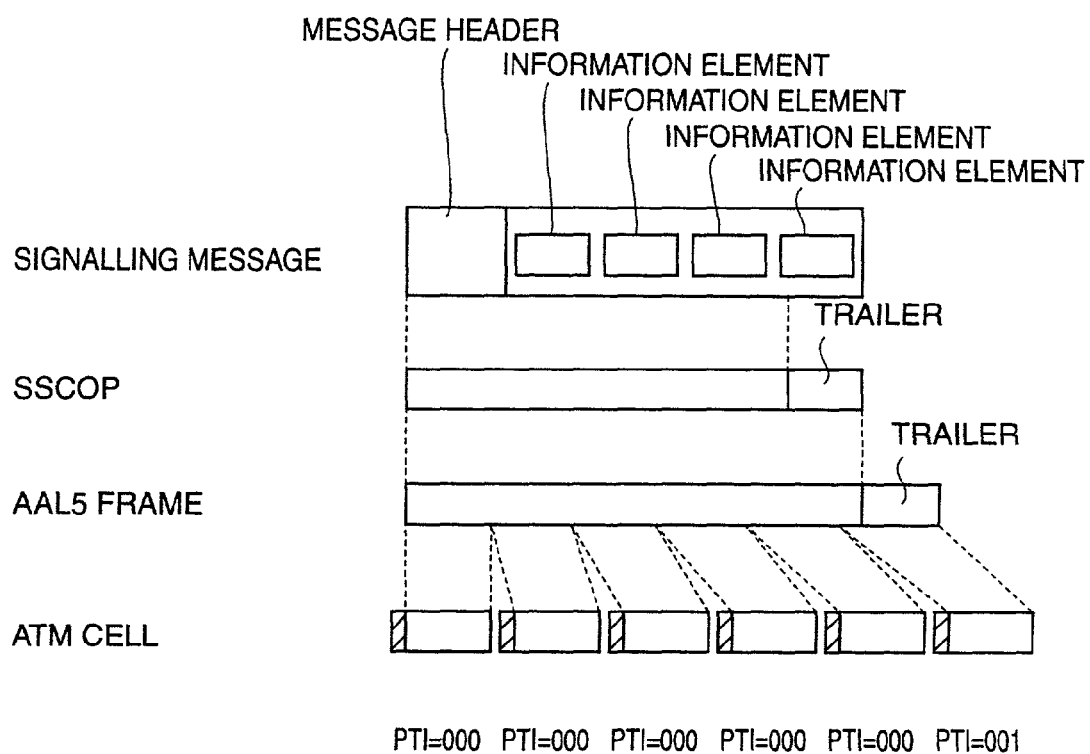
FIG. 24 shows an encapsulation process of a signaling message into an ATM cell.

The SSCOP frame processing unit 55 restructures an SSCOP frame as shown in FIG. 24, and stores the frame in a message buffer 56. If a VC registration unit 57 (registration unit) detects storing of a SETUP message and a CONNECT message thereto into the message buffer 56, it extracts a VPI/VCI of these messages, and registers this entry into the management memory 26. Moreover, if a VC deletion unit 58 (fifth deletion unit) detects storing of a RELEASE message and a RELEASE ACK message into the message buffer 56, it extracts a VPI/VCI of these messages, and deletes the entry of this VPI/VCI from the management memory 26.

In this embodiment, management resources can be assigned to a virtual channel that is set up/released by signaling in a virtual path contracted with an apparatus that does not have the signaling information terminated conventionally, such as an ATM transmission apparatus. In this manner, even if a contract is made on a VP-basis, an EPD process and the like which are VC-based frame processes are available.

Figure 27:
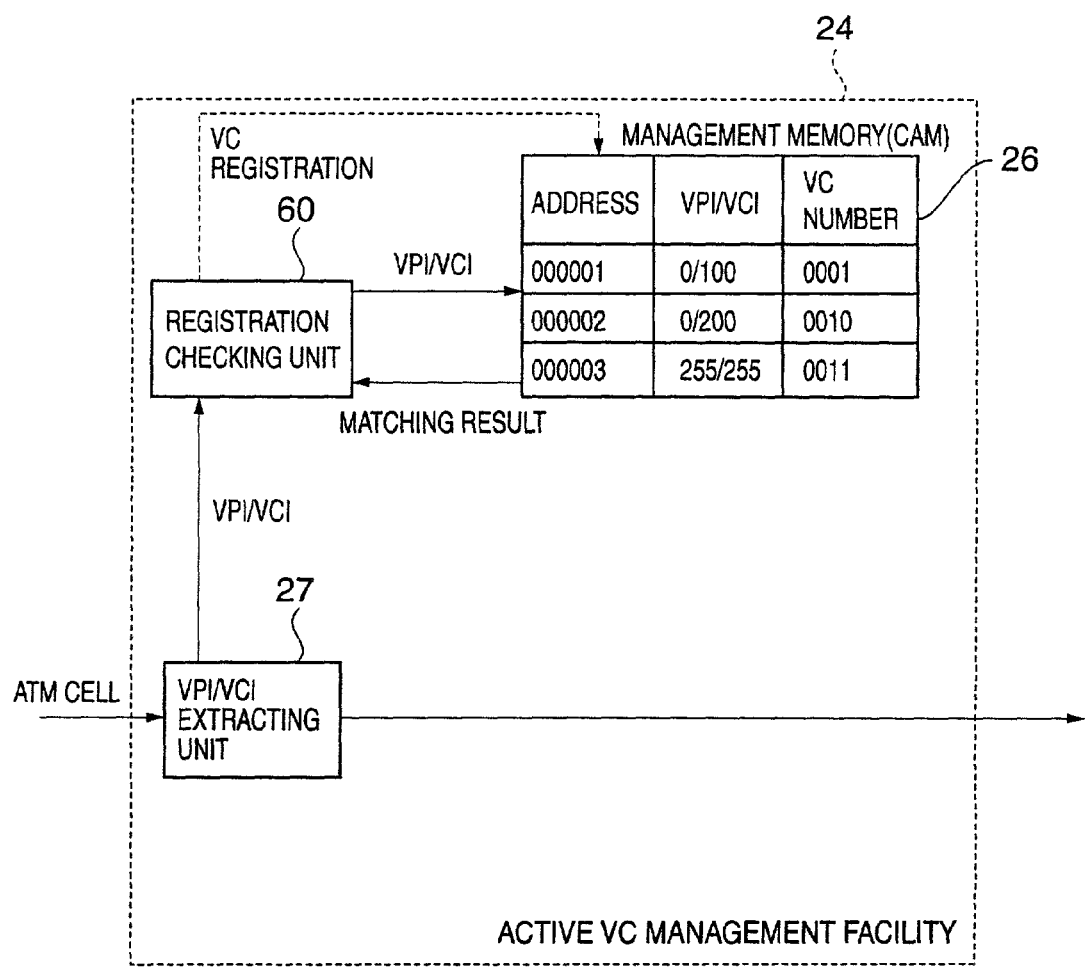
FIG. 27 is a block diagram of an active VC management facility unit 24 of the 13th embodiment of an apparatus of the present invention.

FIG. 27 is a block diagram of an active VC management facility unit 24 of the 13th embodiment of an apparatus of the present invention. In this embodiment, CAM (Content Addressable Memory) is used instead of usual RAM as the management memory 26. In the drawing, a registration checking circuit 60 provides a VPI/VCI extracted from an arriving ATM cell supplied from the VPI/VCI extraction unit 27 to the CAM of the management memory 26 as a matching input. When the CAM returns a "no match", the virtual channel of the VPI/VCI is registered into the CAM of the management memory 26.

Figure 28:
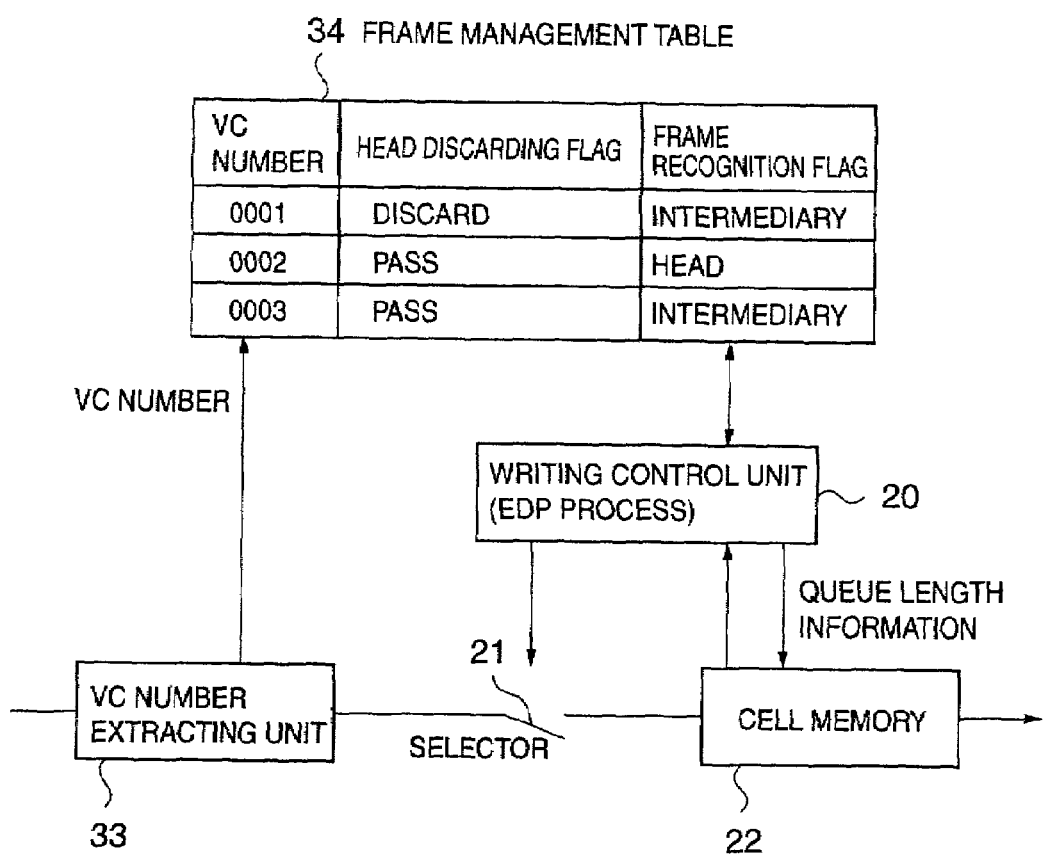
FIG. 28 is a block diagram of the 14th embodiment of an apparatus of the present invention.

FIG. 28 is a block diagram of the 14th embodiment of an apparatus of the present invention. This embodiment describes in detail a case where the writing control unit 20 shown in FIG. 7 performs the EPD process. In FIG. 28, elements that are common to those in FIG. 7 are given with the same numbering. Further, FIG. 29 is a flowchart of the EPD process which the writing control unit 20 executes.

In FIG. 28, a frame management table (frame management unit) 34 is provided with a head discarding flag indicating whether a head cell of a frame of a VC number was discarded, or passed (stored into the cell memory 22) for every VC number extracted from the cell by the VC number extraction unit 33, and a frame recognition flag indicating whether a cell inputted last was a head of a frame or middle of a frame. The head discarding flag and the frame recognition flag read with reference to the table 34, using the VC number extracted from the inputted cell, are supplied to the writing control unit 20, and the writing control unit 20 controls the selector 21 by performing a process as shown in FIG. 29 based on this information and the queue size of the cell memory 22.

Figure 29:
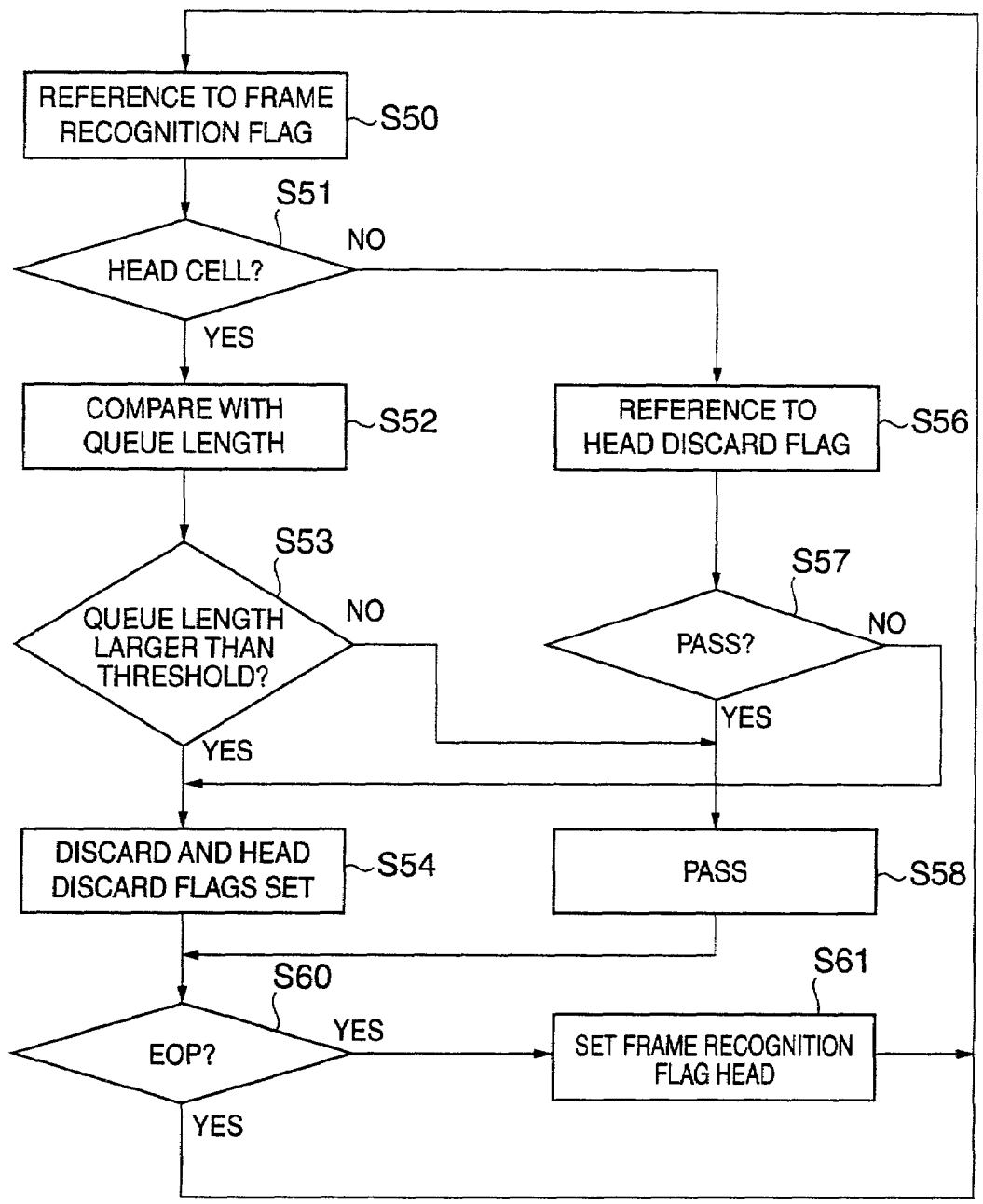
FIG. 29 is a flowchart of an EPD processing performed by a writing control unit 20.

In FIG. 29, whether an input cell is a head cell or otherwise is checked at a step S51 with reference to the frame recognition flag read from the frame management table 34 at a step S50. If the cell is a head cell, queue size of the cell memory 22 is compared with a threshold at a step S52, and whether the queue is larger than the threshold is checked at a step S53. If the queue size is equal to or larger than the threshold, this input cell is discarded, and the head discarding flag is set to discarding at a step S54. Moreover, if the queue size is smaller than the threshold, this input cell is passed and supplied to the cell memory 22 at a step S58.

Conversely, if the input cell is determined not being a head cell at the step S51, the head discarding flag is referenced at a step S56, and whether this head discarding flag indicates a "pass" is checked at a step S57. When the "pass" is indicated, the inputted cell is supplied to the cell memory 22 by passing the cell through the selector 21 at a step S58. If the flag is "no pass", the input cell is discarded, and discarding is set to the head discarding flag at the step S54.

Then, whether a cell is the last cell (EOP) of a frame is checked at step S60, and only when it is the last cell, the frame recognition flag of the VC number concerned is set to "head" at a step S61. Then, the process advances to the step S50.

Figure 30:
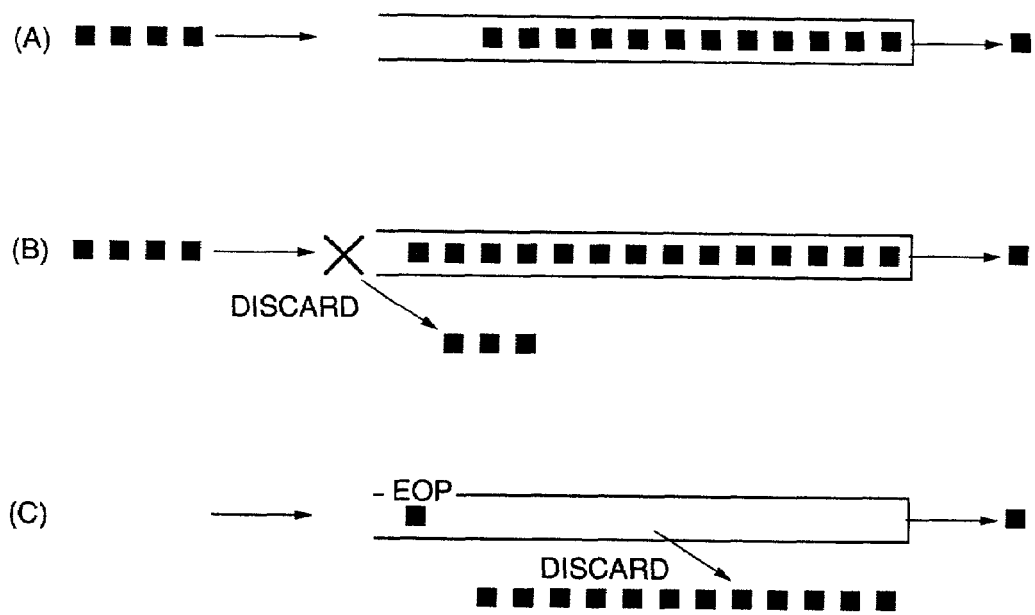
FIG. 30 describes a PPD.

Next, a PPD (Partial Packet Discard) processing which is a kind of frame processing will be described. The PPD discards all cells (also including queue contents) other than the last cell (EOP: End Of Packet) of a frame as shown in FIG. 30(C), when the queue becomes full and an input cell is discarded on the way as shown in FIG. 30(B) after the head of a frame is outputted from the queue as shown in FIG. 30(A).

Figure 31:
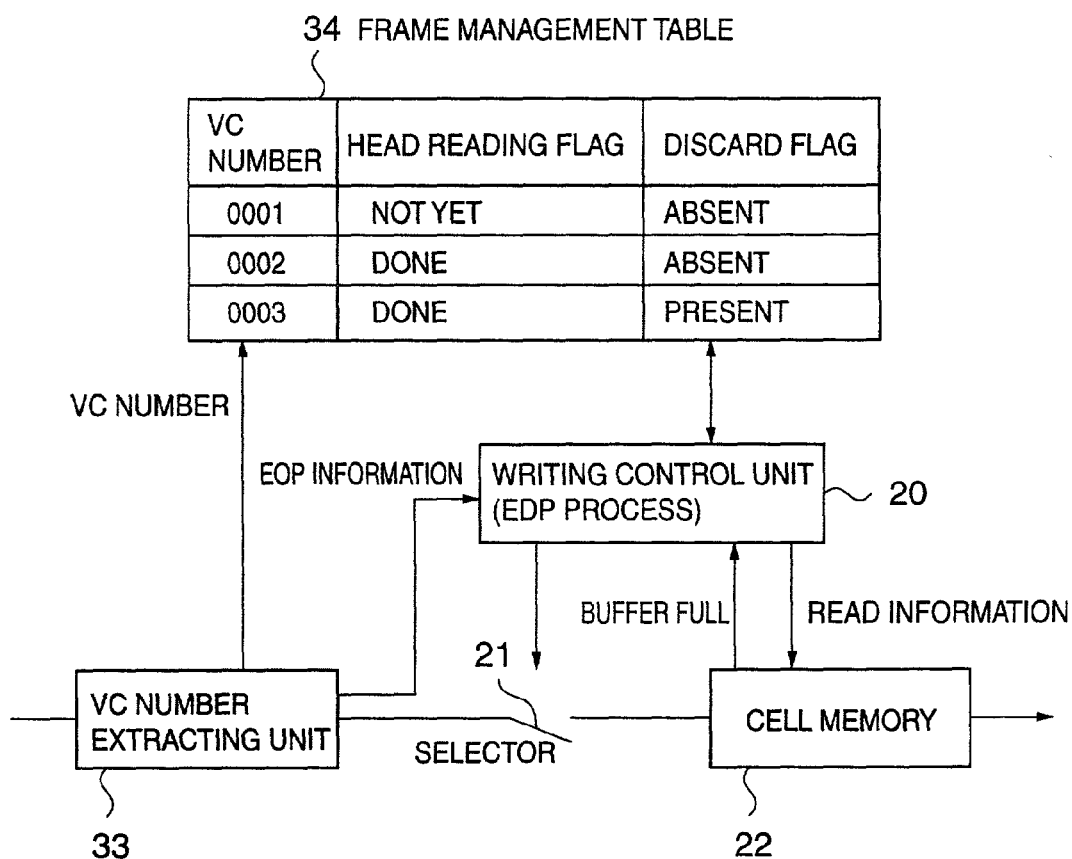
FIG. 31 is a block diagram of the 15th embodiment of an apparatus of the present invention.
Figure 32:
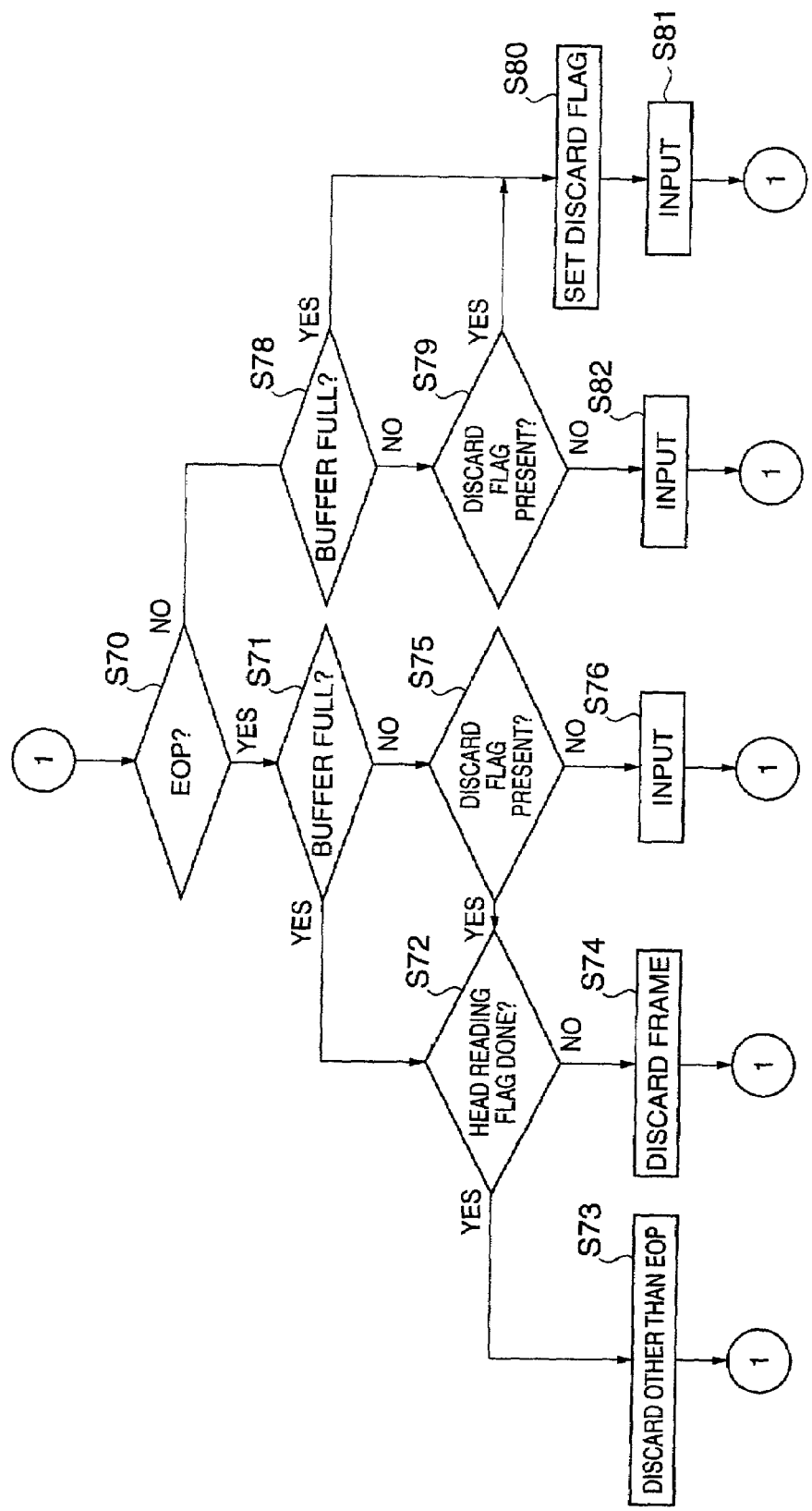
FIG. 32 is a flowchart of the PPD processing performed by the writing control unit 20.

FIG. 31 is a block diagram of the 15th embodiment of an apparatus of the present invention. This embodiment describes in detail a case where the writing control unit 20 shown in FIG. 7 performs the PPD processing. Where elements in FIG. 31 are common to those in FIG. 7, they bear the same numbering. FIG. 32 is a flowchart of the PPD processing performed by the writing control unit 20.

In FIG. 31, a frame management table 34 is provided with a head read-out flag indicating whether a head cell of a frame of a VC number was read for every VC number extracted from a cell by the VC number extraction unit 33, and a discarding flag indicating whether the cell of this frame was discarded. Here, if the head cell of the frame is already read from the cell memory 22, the head read-out flag is set to "done", and if an input cell is discarded due to the cell memory 22 being fully occupied, the discarding flag is set to "present".

While the head read-out flag and the discarding flag that are read with reference to this frame management table 34 by the VC number extracted from the input cell are supplied to the writing control unit 20, information as to whether the cell extracted from the cell by the VC number extraction unit 33 is EOP is supplied to the writing control unit 20. The writing control unit 20 controls the selector 21 by performing a process shown in FIG. 32, based on the information and information about the occupancy and read-out supplied by the cell memory 22.

In FIG. 32, whether the input cell is the last cell (EOP) of a frame is checked at a step S70. If it is the last cell, whether the cell memory 22 is full (buffer full) is checked at a step S71. If it is full, whether the head read-out flag indicates "done" is checked at a step S72. If, as the result thereof, the head read-out flag indicates "done", all cells except for the last cell of a frame are discarded at a step S73. If it does not indicate "done", the frame of the input cell is discarded at a step S74. Moreover, when the cell memory 22 is not full at the step S71, whether the discarding flag is "present" is checked at a step S75, if it indicates "present", the process proceed to a step S72, if it does not indicate "present", the process proceeds to a step S76, and this input cell is supplied to the cell memory 22 by passing the selector 21.

On the other hand, when an input cell is not the last cell of a frame at the step S70, whether the cell memory 22 is full (buffer full) and whether the discarding flag indicates "present" are checked at steps S78 and S81, respectively. If it is full or the discarding flag indicates "present", the discarding flag of the frame management table 34 corresponding to the VC number of this input cell is set to "present" at a step S80. Moreover, if it is not full and the discarding flag indicates "absent", the process advances to a step S82, and this input cell is supplied to the cell memory 22 by passing the selector,21.

Figure 33:
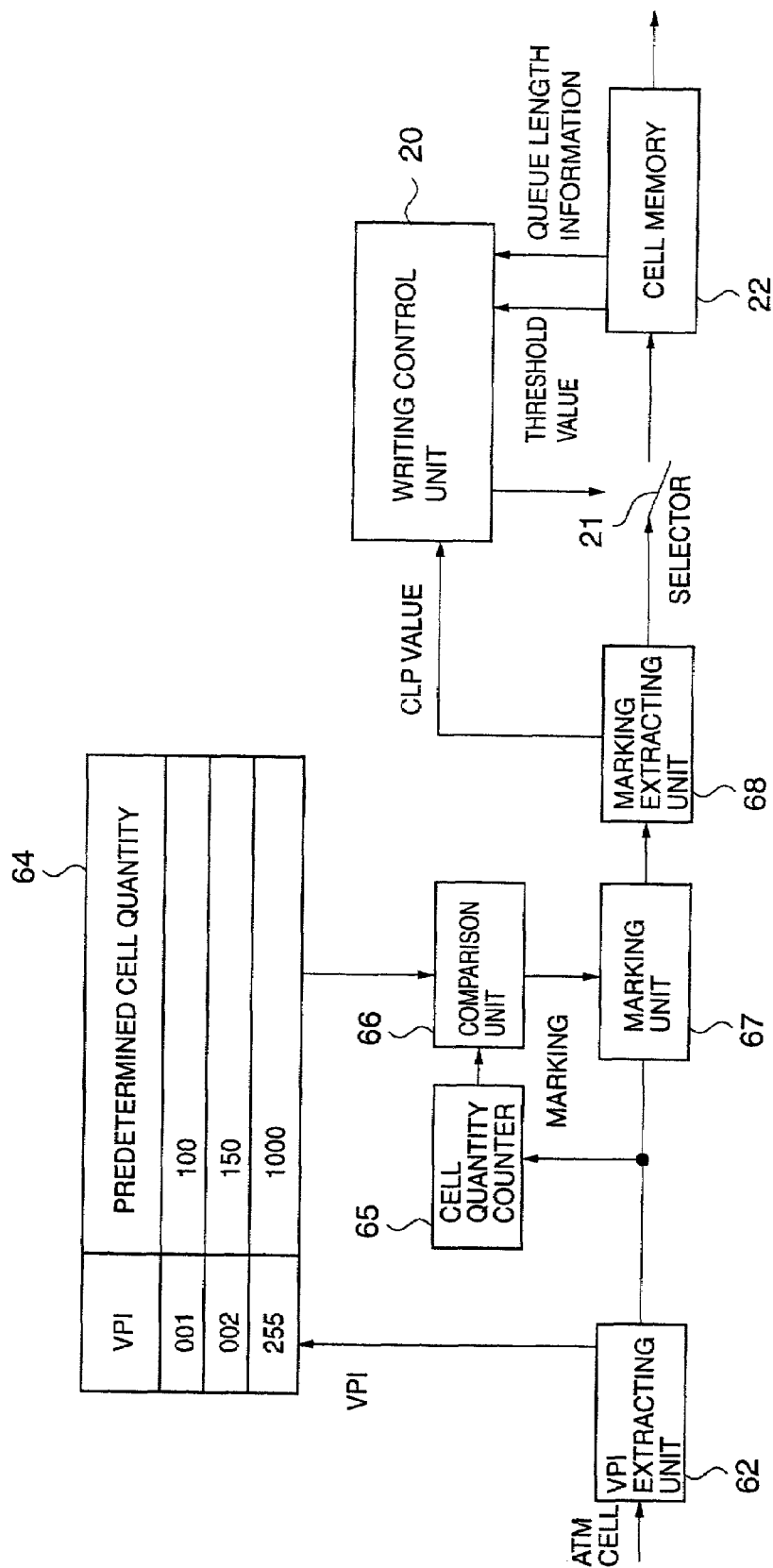
FIG. 33 is a block diagram of the 16th embodiment of an apparatus of the present invention.

FIG. 33 is a block diagram of the 16th embodiment of an apparatus of the present invention. This embodiment offers a minimum bandwidth guarantee for each VP. The number of predetermined cells per unit time (guarantee rate) is set to a VP memory 64 for every virtual path (VPI) in this drawing. A VPI extraction unit 62 extracts a VPI of an arriving ATM cell, and the number of predetermined cells is read from the VP memory 64 with reference to this VPI, and the number is supplied to a comparator 66.

A cell quantity counter 65 (cell quantity counting unit) is reset periodically, and counts the number of arriving cells on a VP-to-VP basis, and supplies the counted value to the comparator 66. The comparator 66 directs a marking to a marking unit 67 (marking unit) when the counted number of arriving cells exceeds a predetermined value that corresponds to the VP. Upon receiving the marking direction, the marking unit 67 will set 1, as the marking, to a CLP bit in the cell header, for example, as shown in FIG. 8.

Then, the CLP bit of a cell is extracted by a marking extraction unit 68, which is supplied to the writing control unit 20. Moreover, a threshold and a queue size from the cell memory 22 are supplied to the writing control unit 20. If the CLP bit of an input cell is not marked with 0, the writing control unit 20 passes the input cell to the selector 21, and supplies the cell to the cell memory 22. If the CLP bit is marked 1, whether the queue size of the cell memory 22 is below the threshold is checked. If the queue size is below the threshold, this input cell is passed through the selector 21 and supplied to the cell memory 22, and if the queue size is over the threshold, this input cell will be discarded. The writing control unit 20 and a selector 21 correspond to discarding unit given in a claim.

That is, since the cell quantity counter 65 is reset periodically, it measures a cell flow rate per unit time. Although the cell of a VP that exceeds a minimum bandwidth guaranteed is inputted into the cell memory 22 if the queue size is below the threshold, this input cell will be discarded if the queue size is over the threshold.

Figure 34:
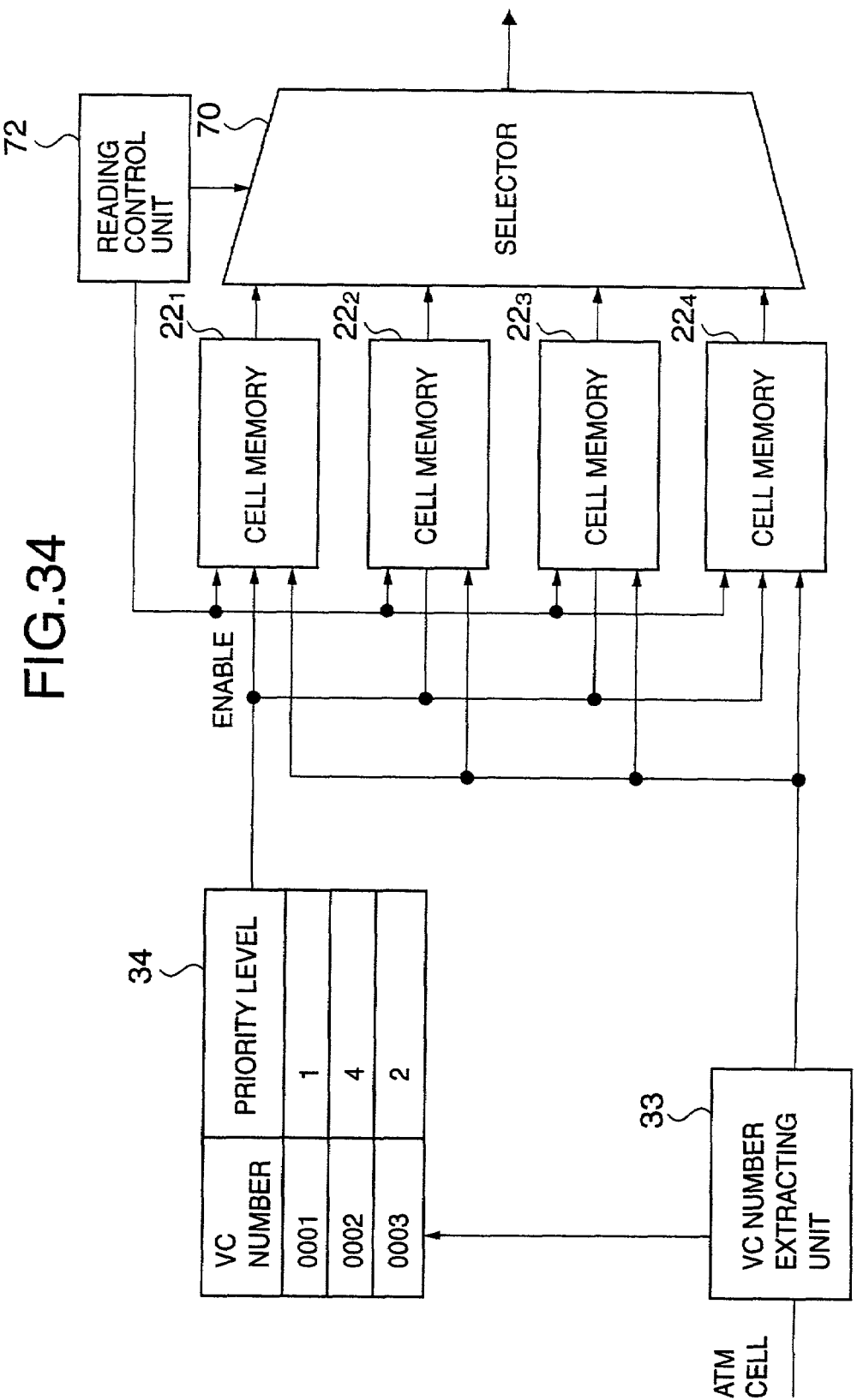
FIG. 34 is a block diagram of the 17th embodiment of an apparatus of the present invention.

FIG. 34 is a block diagram of the 17th embodiment of an apparatus of the present invention. This embodiment gives a priority level to each VC. The priority level (1–4) of each VC number is registered into the frame management table 34 in this drawing for every VC number extracted from the cell by the VC number extraction unit 33. The priorities 1–4 read from this frame management table 34 with reference to the VC number extracted from the input cell are supplied to cell memories $22_1$–$22_4$ as enable signals.

The cell memories $22_1$–$22_4$ are provided corresponding to the priority levels and writing thereto is enabled only for a priority level read from the frame management table 34. That is, if VC number of an input cell is 1 and the priority level is 1, writing to only the cell memory 22, will be enabled and this input cell will be written only in the cell memory $22_1$.

If a cell is present in the cell memory $22_1$ that is with the highest priority level, a read-out control unit 72 gives a priority to this cell memory $22_1$, reads the cell, and outputs the cell through a selector 70. If there is no cell present in the cell memory $22_1$, whether a cell is present in the cell memory $22_2$ that has the next highest priority level is checked. If there is a cell, a priority is given to the cell memory $22_2$, a cell is read, and outputted through the selector 70.

Further, if there is no cell in the cell memory $22_2$, whether a cell is present in the cell memory $22_3$ with the next highest priority level is checked. If the cell memory $22_3$ has a cell, the read-out control unit 72 gives a priority to the cell memory, reads a cell thereof, and outputs the cell through the selector 70. If there is no cell in the cell memory $22_3$, whether a cell is present in the cell memory $22_4$ is checked, and if there is a cell, it is read from the cell memory $22_4$ and outputted through the selector 70. In this manner, cells to which a priority level is attached for every VC can be read according to the priority level.

Figure 35:
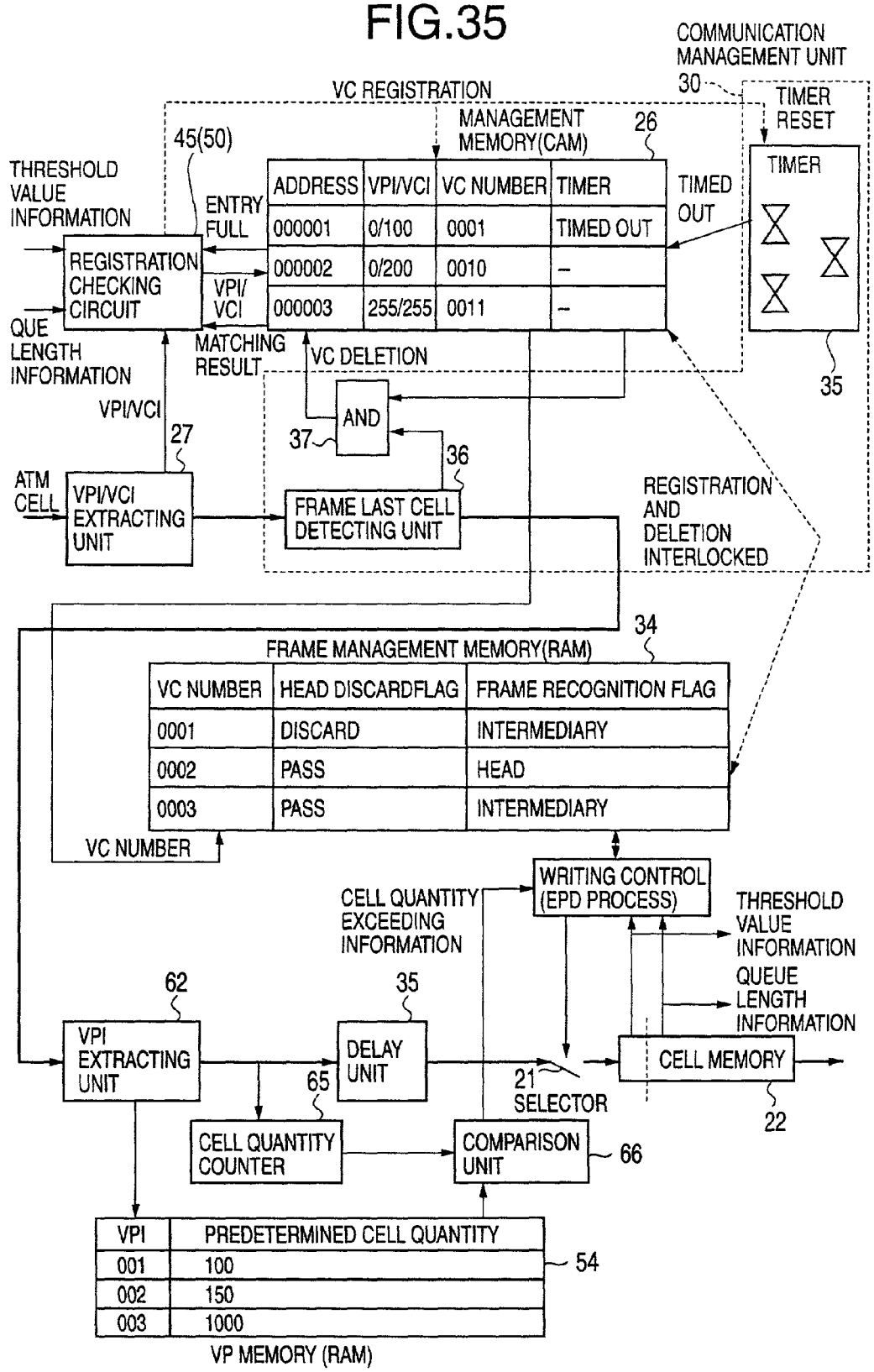
FIG. 35 is a block diagram of the 18th embodiment of an apparatus of the present invention.

FIG. 35 is a block diagram of the 18th embodiment of an apparatus of the present invention. This embodiment relates to an apparatus which performs dynamic virtual channel management and EPD with the minimum bandwidth guarantee by assembling each of the embodiments shown in FIG. 11, FIG. 21, FIG. 27, FIG. 28, and FIG. 33 described above.

In the drawing, thick solid lines indicate flow of a main signal cell, and thin solid lines indicate a control signal. The main signal is supplied to the VPI/VCI extraction unit 27, and a VPI/VCI is extracted from a cell header. A registration checking unit 46 (corresponding to 60 in FIG. 27) checks by a CAM whether this VPI/VCI is registered in the management memory 26 that includes the CAM. At this time, whether a registration to the management memory 26 should be performed is determined, based on the matching result, a signal indicating entry occupancy status of the management memory 26, threshold information on the cell memory 22, queue size information, and the like.

For example, algorithm of a registration checking is such that the registration checking unit 46 allows to register a new entry into the management memory 26, if there is no matching in the CAM, if entries are not full and if (threshold N1-queue size) is below the predetermined value K.

At this time, the timer 35 for every virtual channel is set simultaneously. If this timer carries out a time-out, the fact thereof will be written into the management memory 26. If the frame-last-cell is detected by the frame-last-cell detecting unit 36 using the PTI bit of the main signal and if the timer of the virtual channel has carried out the time-out, the virtual channel will be deleted from the management memory 26.

Next, a VC number corresponding to the virtual channel of an input cell is outputted from the management memory 26, and sent to a later stage with the main signal. In the later stage, a head read-out flag corresponding to the virtual channel and a frame recognition flag are read from the VC number, using the frame management table 34, and a control of writing to the cell memory 22 is performed. Simultaneously, VPI is extracted from the main signal cell header by the VPI extraction unit 62, and a "predetermined number of cells" is acquired, which is compared with the value of the cell quantity counter 65 (reset periodically) for every VPI, and the result is used for writing control of the cell memory 22.

In addition, although the VP memory 64 is provided with the predetermined number of cells for every VP (the number of cells equivalent to the minimum bandwidth guarantee) at a time of a contract, an entry registration or cancellation is performed in the frame management memory 34 and in the management memory 26 simultaneously. The writing control unit 20 realizes a minimum bandwidth guarantee and an EPD function simultaneously by performing controls in accordance with the flowchart shown in FIG. 36.

Figure 36:
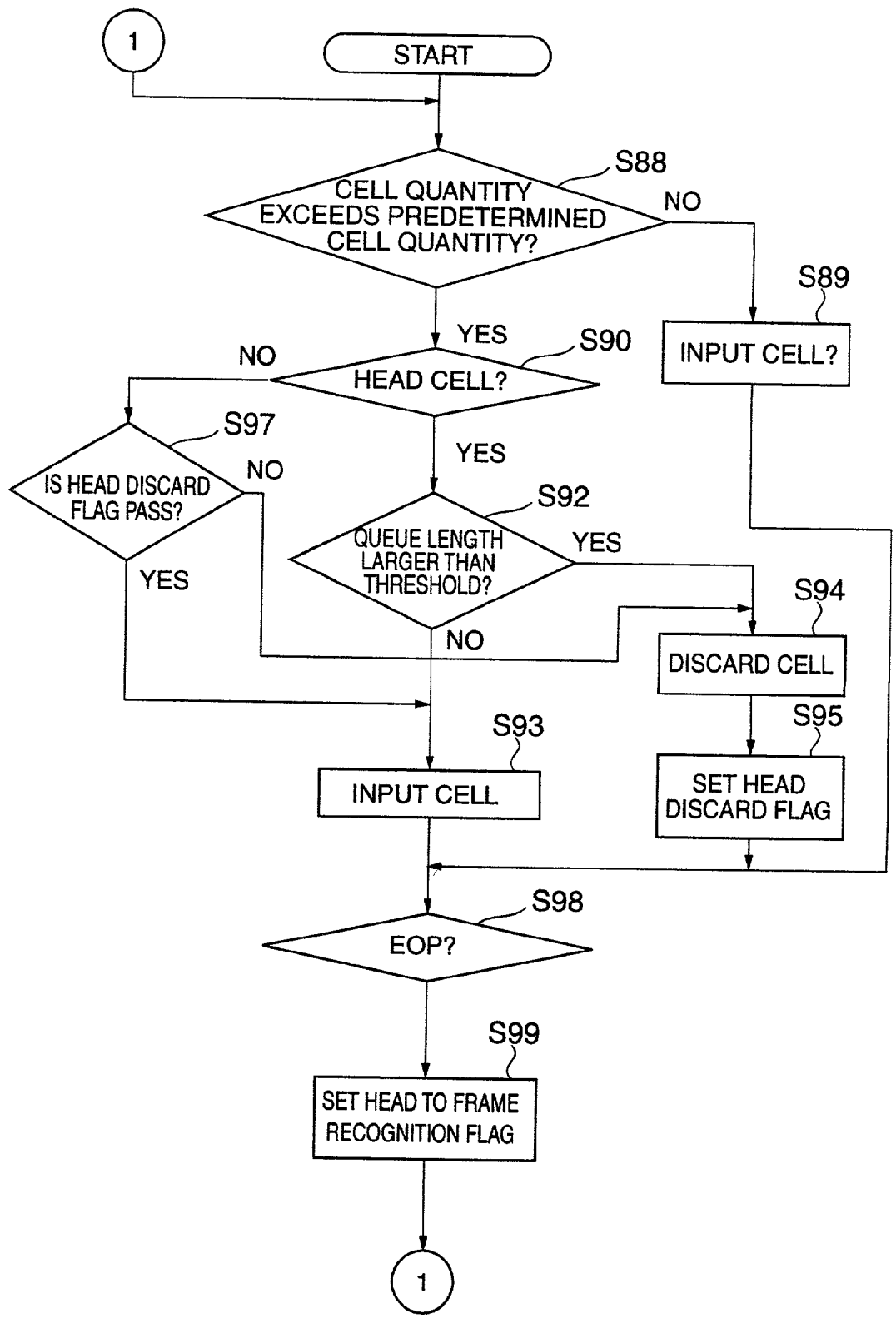
FIG. 36 is a flowchart of a processing performed by the writing control unit 20.

In FIG. 36, whether the number of cells has exceeded the number of predetermined cells is checked using the comparison result of a comparator 66 at a step S88. The cell is inputted into the cell memory 22 at a step S89, if it has not exceeded. If it has exceeded, the process advances to a step S90 where whether it is a head cell is checked with reference to the frame recognition flag read from the frame management table 34. If it is a head cell, whether a queue length of the cell memory 22 is larger than a threshold is checked in a step S92. If the queue size is equal to or larger than the threshold, the process will advance to a step S94, this input cell will be discarded, and discarding will be set to the head discarding flag at a step S95. If the queue size is below the threshold, the process will advance to a step S93, and this input cell is passed and supplied to the cell memory 22.

On the other hand, if the input cell is not a head cell at the step S90, whether the head discarding flag indicates a "pass" is checked at a step S97. If it indicates a "pass", the process advances to a step S93, and this input cell is supplied to the cell memory 22 by passing the selector 21. Moreover, if it does not indicate a "pass", the process advances to a step S94 and this input cell is discarded, and discarding is set to the head discarding flag at a step S95.

Then, whether the cell is the last cell (EOP) of a frame is checked at a step S98, and only when the cell is the last cell, the frame recognition flag of the VC number concerned is set to "head" at a step S99. Then, it progresses to a step S88.

Figure 37:
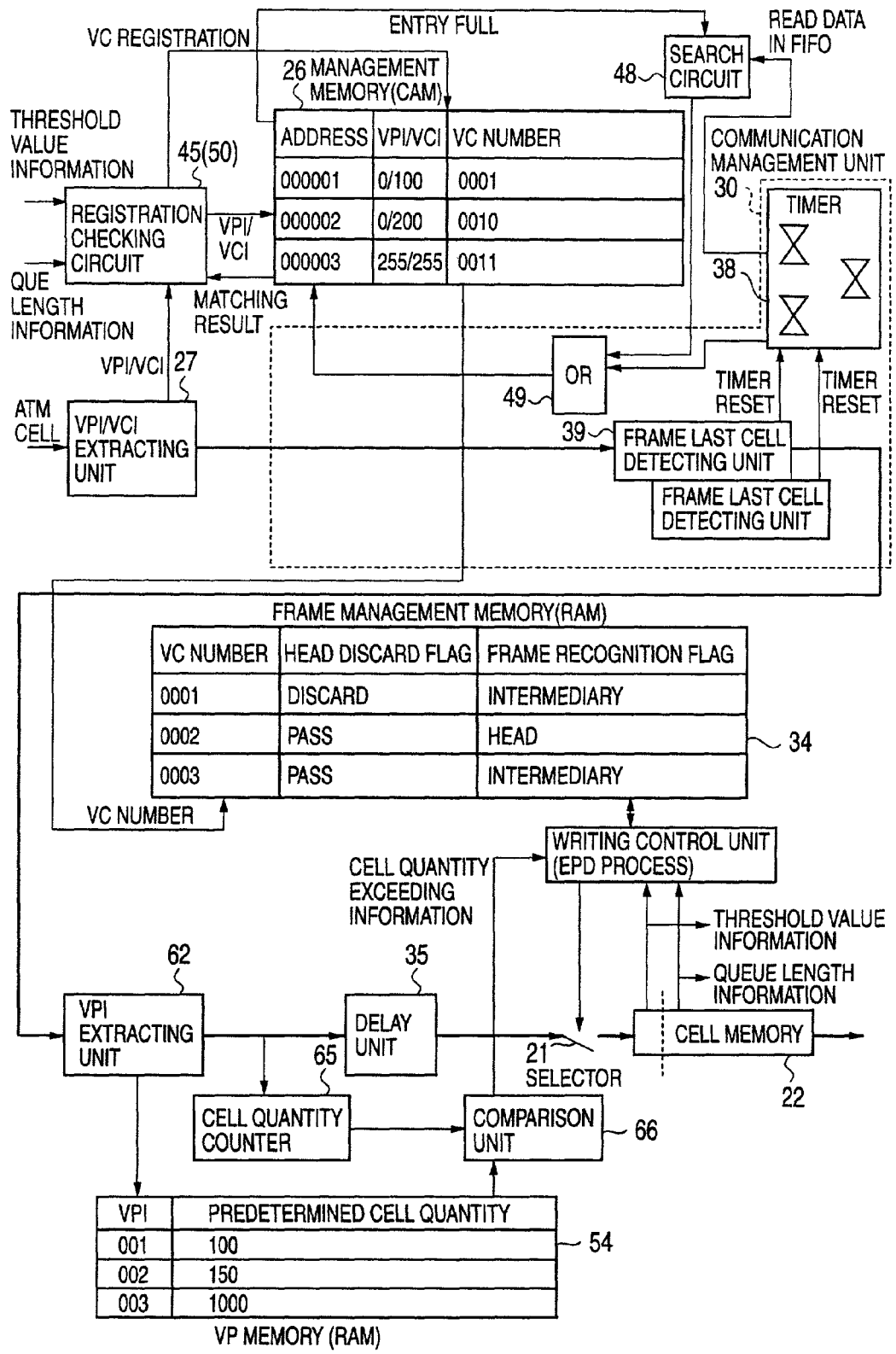
FIG. 37 is a block diagram of the 19th embodiment of an apparatus of the present invention.

FIG. 37 is a block diagram of the 19th embodiment of an apparatus of the present invention. This embodiment relates to an apparatus which performs dynamic virtual channel management and EPD with the minimum bandwidth guarantee by assembling each of the embodiments shown in FIG. 21, FIG. 22, FIG. 27, FIG. 28, and FIG. 33 described above.

In the drawing, thick solid lines indicate a flow of a main signal cell, and thin solid lines indicate a control signal. The main signal is supplied to the VPI/VCI extraction unit 27, and a VPI/VCI is extracted from the cell header. The registration checking unit 46 (corresponding to 60 in FIG. 27) checks by a CAM whether this VPI/VCI is registered in the management memory 26 that includes the CAM. At this time, whether a registration into the management memory 26 should be performed is determined, based on the matching result, a signal indicating entry occupancy status of the management memory 26, threshold information on the cell memory 22, queue size information, and the like.

For example, algorithm of a registration checking is such that the registration checking unit 46 allows to register a new entry into the management memory 26, if there is no matching in the CAM, if entries are not full and if (threshold N1-queue size) is below the predetermined value K. At this time, the timer 35 for every virtual channel is set simultaneously. If this timer carries out a time-out, the fact thereof will be written into the management memory 26.

Here, if the entry of the management memory 26 is full, a signal indicative of the entry being full is supplied to the search circuit 48. Within the communication management unit 30, when a head cell of a frame of the same virtual channel is detected by the frame-head-cell detecting unit 40, the timer 38 for every virtual channel is started. When the last cell of a frame is detected by the frame-last-cell detecting unit 39, before the time-out, the timer 38 of this virtual channel is reset. A VPI/VCI (virtual channel) which corresponds to the time-out of the timer 38 is deleted from the entry of the management memory 26.

Upon receipt of a signal which indicative of the entry being full, the search circuit 48 searches a virtual channel that is the nearest to the time-out by reading contents of the timer 38 when the entry full signal is supplied. When the demand to register a new entry into the management memory 26 is supplied to the management memory 26 from the matching circuit 28 for a VPI/VCI extracted from the ATM cell, a direction to delete a virtual channel searched through an OR circuit 49 in the communication management unit 30 from the search circuit 48 is supplied to the management memory 26. This virtual channel is deleted from the entry of the management memory 26, and the new entry from the matching circuit 28 is registered into the management memory 26.

Next, a VC number identifying the virtual channel of an input cell is outputted from the management memory 26, and sent to a later stage with the main signal. In the later stage, the head read-out flag to the virtual channel and a frame recognition flag are read from the VC number, using the frame management table 34, and a control of writing to the cell memory 22 is performed. Simultaneously, a VPI is extracted from the main signal cell header by the VPI extraction unit 62, and a "predetermined number of cells" of the VPI is acquired, which is compared with the value of the cell quantity counter 65 (reset periodically) for every VPI, the result of which is used for writing control of the cell memory 22.

Figure 38:
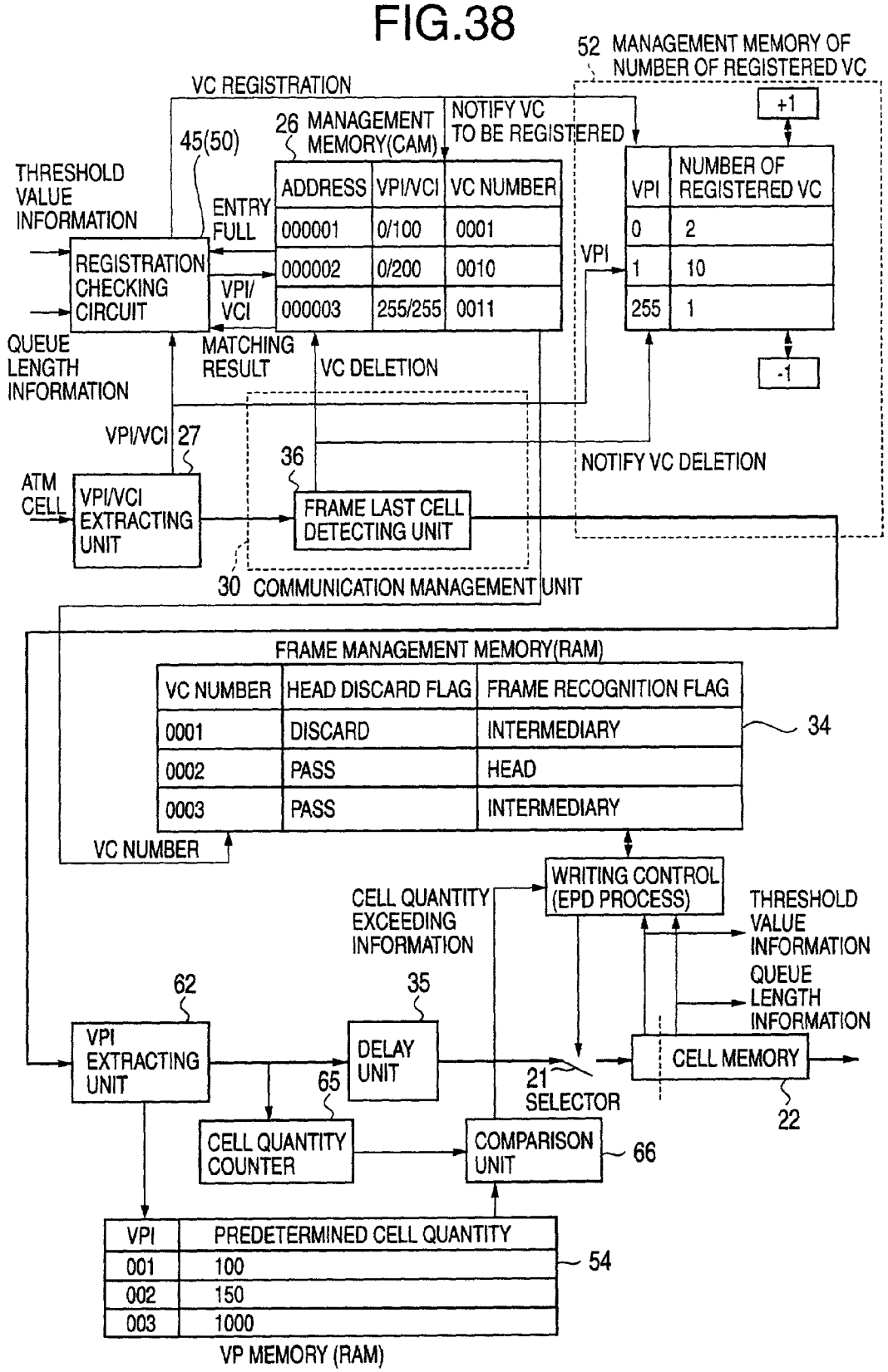
FIG. 38 is a block diagram of the 20th embodiment of an apparatus of the present invention.

FIG. 38 is a block diagram of the 20th embodiment of an apparatus of the present invention. This embodiment relates to an apparatus which performs the dynamic virtual channel management and the EPD with minimum bandwidth guarantee by assembling each of the embodiments shown in FIG. 21, FIG. 23, FIG. 27, FIG. 28, and FIG. 33 described above.

Thick solid lines indicate a flow of a main signal cell, and thin solid lines indicate a control signal in this drawing. The main signal is supplied to the VPI/VCI extraction unit 27, and a VPI/VCI is extracted from a cell header. In the registration checking unit 50 (corresponding to 60 in FIG. 27), matching is made by a CAM as to whether this VPI/VCI is registered in the management memory 26 which includes the CAM. Here, a registered VC number management memory 52 is provided, which stores the number of registered VCs of every VP (VPI) (the number of VCs registered into the management memory 26) to each entry, in addition to the management memory 26 which stores a VPI/VCI and management information thereof to each entry.

Regarding each number of registered VCs in the registered VC number management memory 52, the number of registered VCs of a corresponding VP is incremented by one when a VC is registered into the management memory 26, and the number of registered VCs of a corresponding VP is decremented by one when a VC is deleted from the management memory 26. Moreover, the management memory 26 provides the registration checking unit 50 with an "almost full" signal indicative of the number of entries being almost full exceeding a threshold, but before fully occupied.

Algorithm of a registration checking of the registration checking unit 50 allows registering a new entry into the management memory 26, if there is no matching in the CAM, if (threshold N1-queue size) is below the predetermined values K, if the "almost full" signal is supplied from the management memory 26, and if the number of registered VCs is less than a threshold N2. At this time, the timer 35 provided for every virtual channel is set simultaneously.

If a frame-last-cell is detected using the PTI bit of the main signal by the frame-last-cell detecting unit 36 and if the timer of the virtual channel has been timed-out, the virtual channel will be deleted from the management memory 26.

Next, a VC number corresponding to the virtual channel of an input cell is outputted from the management memory 26, and is sent to a later stage with the main signal. In the later stage, a head read-out flag and a frame recognition flag corresponding to the virtual channel are read from the VC number, using the frame management table 34, and a control of writing to the cell memory 22 is performed. A VPI is simultaneously extracted from a main signal cell header by the VPI extraction unit 62, and "the number of predetermined cells" corresponding to the VPI is acquired, which is compared with a value of a cell quantity counter 65 (reset periodically) for every VPI, and the result thereof is used for a control of writing to the cell memory 22.

Figure 39:
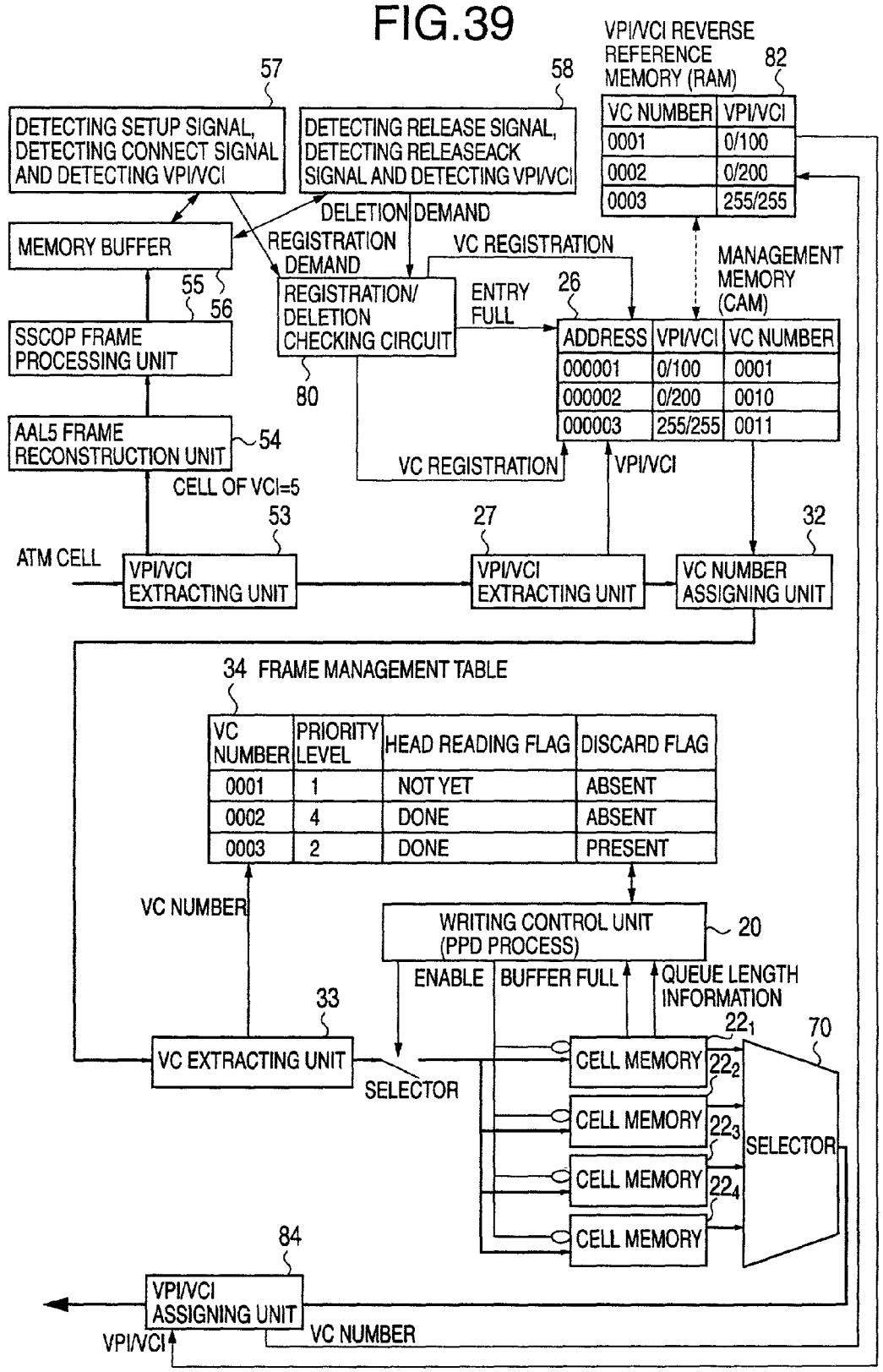
FIG. 39 is a block diagram of the 21st embodiment of an apparatus of the present invention.

FIG. 39 is a block diagram of the 21st embodiment of an apparatus of the present invention. This embodiment relates to an apparatus which performs dynamic virtual channel management, writing with a priority level for each VC, and PPD, by assembling each of the embodiments in FIG. 26, FIG. 31, and FIG. 34 described above.

Thick solid lines indicate a flow of the main signal cell, and thin solid lines indicate a control signal in the drawing. A cell of VCI=5 is extracted by the VPI/VCI extraction unit 53 from the main signal, and supplied to an AAL5 reconstruction unit 54. Here, the cell of VCI=5 indicates a signaling cell. An SSCOP frame reconfigured by the AAL5 reconstruction unit 54 and an SSCOP frame processing unit 55 is stored in a message buffer 56. When a VC registration unit 57 detects that a SETUP message and a CONNECT message thereto are stored in the message buffer 56, a VPI/VCI of these messages is extracted and a registration demand issued to a registration/deletion checking circuit 80. Moreover, if a VC deletion unit 58 detects that a RELEASE message and a RELEASE ACK message thereto are stored in the message buffer 56, a VPI/VCI of these messages is extracted and a deletion demand is issued to the registration/deletion checking circuit 80.

Further, the VPI/VCI extraction unit 27 extracts the VPI/VCI from the cell header of the main signal, CAM performs matching as to whether this VPI/VCI is registered in the management memory 26 which includes the CAM, and the matching result thereof, and information on whether the management memory 26 is full is supplied to the registration/deletion checking circuit 80. When there is a registration demand, if there is no matching and if the management memory 26 is not full, the registration/deletion checking circuit 80 will perform an entry registration to the management memory 26, and if there is a deletion demand, it will delete an entry. In addition, a VPI/VCI reverse reference memory 82 corresponding to the management memory 26 is also registered/deleted simultaneously.

In the VC number assigning unit 32, a VC number corresponding to the VPI/VCI is written into the cell header of the main signal.

In a later stage, a head read-out flag, a frame recognition flag, and a priority level corresponding to a virtual channel are read from a VC number extracted by the VC number extraction unit 33 with reference to the frame management table 34, and writing control of the cell memories $22_1$–$22_4$ is performed. Here, the head read-out flag and the frame recognition flag are used similarly to the previous embodiments. Further, if the priority level from the frame management table 34 is 1, only the cell memory $22_1$ will be enabled, if the priority level is 2, only the cell memory $22_2$ will be enabled, if the priority level is 3, only the cell memory $22_3$ will be enabled, and if the priority level is 4, only the cell memory $22_4$ will be enabled. In this manner, priority control and PPD control are simultaneously realized.

Thus, according to the present invention, even if a contract with a user is on a VP-by-VP basis for a leased line service available on VP-by-VP basis, process can be on a virtual-channel-to-virtual-channel basis. Therefore, when a bandwidth is shared between virtual paths, the process for each frame, i.e., EPD, PPD, and the like, can be performed, rather than for each cell, realizing an effective use of networks.

Moreover, services such as GFR (Guaranteed Frame Rate: a class such as EPD/PPD that introduces a frame-based processing and guarantees a minimum rate at the same time) have been available only in a virtual-channel-to-virtual-channel service, but can now be offered on a VP-to-VP basis. For this reason, it is not necessary to make a contract for a plurality of virtual channels, but a contract of only one circuit of VP allows an ATM bandwidth sharing. For users, reduction in service cost can be expected. For carriers, more users, such as for connections between ATM-LANs, can be expected.

Moreover, if the present invention is applied, resources (for example, entry into the management table) will not be occupied by virtual channels that are not communicating, enabling to accommodate a larger number of virtual channels, because it is not necessary to set up a virtual channel beforehand. Hence, it becomes possible to lower the communication cost per user.

What is claimed is:

1. A dynamic virtual channel management apparatus, comprising:
   a detection unit which detects an active virtual channel used by an arriving ATM cell;
   a management memory unit which manages management information about the active virtual channel detected by the detection unit for each virtual channel, the management memory unit including a translation table and a frame management table, the translation table converting a virtual channel identifier contained in a cell header of the cell into an internal management number for internal management, the frame management table storing information for frame-by-frame processing of each virtual channel in such a manner as to correspond to the internal management number; and
   a first registration unit that registers a virtual channel identifier of an arriving cell into the management memory unit when the virtual channel identifier of the arriving cell is not managed by the management memory unit,
   wherein processing on a frame-by-frame basis is applied to cells having the virtual channel identifier that matches that of the active virtual channel managed by the management memory unit.

2. The dynamic virtual channel management apparatus as claimed in claim 1, comprising:
   an internal management number writing unit which writes the internal management number into the cell header of the cell; and
   an internal management number reading unit that retrieves the internal management number from the cell header of the cell, and uses the retrieved internal management number for referring to the frame management table.

3. The dynamic virtual channel management apparatus as claimed in claim 1, wherein the internal management number is transmitted in parallel with the cell data, and is used for referring to the frame management table.

4. The dynamic virtual channel management apparatus as claimed in claim 1, comprising:
   a timer unit which is provided for each virtual channel managed by the management memory unit;
   a timer start unit which starts the timer unit each time a head cell of a frame arrives; and
   a first deletion unit which deletes from the management memory unit an entry of a virtual channel that corresponds to a last cell of a frame arriving after the timer unit indicates a time-out.

5. The dynamic virtual channel management apparatus as claimed in claim 1, comprising:
   a timer unit which is provided for each virtual channel managed by the management memory unit;
   a timer start unit which starts the timer unit each time a head cell of a frame arrives; and
   a first deletion unit which deletes an entry of a virtual channel from the management memory unit when a corresponding timer unit indicates a time-out before a head cell of a next frame arrives.

6. The dynamic virtual channel management apparatus as claimed in claim 5, wherein the timer unit comprises:
   a shifting unit which shifts virtual channel information;
   a frame number counting unit which counts a number indicative of how many frames are shifted by the shifting unit on a virtual-channel-to-virtual-channel basis;
   a count-up unit which counts up the frame number counting unit of a virtual channel which corresponds to a head cell of a frame that arrives; and
   a count-down unit which counts down the frame number counting unit of a virtual channel which corresponds to virtual channel information that is shifted-out from the shifting unit,
   wherein a virtual channel for which the count number of the frame number counting unit becomes zero is given a time-out.

7. The dynamic virtual channel management apparatus as claimed in claim 5, comprising a second deletion unit which finds a virtual channel that is close to a time-out of the timer unit, and forcing the found virtual channel to be given a time-out, and deletes an entry of the found virtual channel from the management memory unit when a cell having a virtual channel identifier that is not managed arrives while the management memory unit is fully occupied.

8. The dynamic virtual channel management apparatus as claimed in claim 1, comprising a first deletion unit which deletes from the management memory unit an identifier of a virtual channel of a last cell of a frame whose arrival is detected.

9. The dynamic virtual channel management apparatus as claimed in claim 1, comprising a disapproving unit that disapproves registering of a virtual channel identifier of a cell into the management memory unit if a cell belonging to a virtual channel that is not managed arrives while the management memory unit is fully occupied.

10. The dynamic virtual channel management apparatus as claimed in claim 1, comprising a first registration determination unit which determines whether a virtual channel is allowed to be registered into the management memory unit based on a cell holding-up volume of a cell memory at a later stage and a threshold when a cell having a virtual channel identifier that is not managed by the management memory unit arrives.

11. The dynamic virtual channel management apparatus as claimed in claim 1, comprising:
 a VC number counting unit which counts a number indicative of how many virtual channels are managed by the management memory unit on a virtual-path-to-virtual-path basis; and
 a second registration determination unit which allows a registration into the management memory unit when a cell having a virtual channel identifier that is not managed by the management memory unit arrives only when the number counted by the VC number counting unit corresponding to a virtual channel of an arriving cell is not above a predetermined value while a number indicative of how many entries are present in the management memory unit exceeds a predetermined value.

12. The dynamic virtual channel management apparatus as claimed in claim 1, comprising:
 a signaling extraction unit which extracts a signaling message cell;
 a registration unit which registers a virtual channel identifier of a connection into the management memory unit when a signaling message to establish the connection is detected by the signaling extraction unit; and
 a first deletion unit which deletes the virtual channel identifier of the connection from the management memory unit when a signaling message to release the connection is detected by the signaling extraction unit.

13. The dynamic virtual channel management apparatus as claimed in claim 1, wherein the management memory unit is implemented as a CAM.

14. The dynamic virtual channel management apparatus as claimed in claim 1, comprising:
 a cell memory which stores cells;
 a frame management unit which keeps a record of each virtual channel registered in the management memory unit as to whether a head cell of a frame was passed for storage into the cell memory or discarded,
 wherein a determination is made by referring to the frame management unit as to whether to pass or discard subsequent cells of said frame.

15. The dynamic virtual channel management apparatus as claimed in claim 14, wherein the frame management unit keeps a record of whether a cell of a given frame is discarded after a head cell of the given frame is read from the cell memory while a last cell of the given frame has not been inputted into the cell memory, and wherein if the cell of the given frame is discarded, following cells except for the last cell of the given frame are discarded.

16. The dynamic virtual channel management apparatus as claimed in claim 14, comprising:
 a cell quantity counting unit that counts a number indicative of how many cells have arrived for each virtual path;
 a marking unit which marks a cell on a frame-by-frame basis when a counted number of the cell quantity counting unit exceeds a predetermined number, and
 a discarding unit which discards cells that are marked when an accumulated cell amount in the cell memory exceeds a threshold.

17. The dynamic virtual channel management apparatus as claimed in claim 1, comprising:
 a plurality of cell memories which store cells for respective priority levels; and
 a distribution unit which distributes arriving cells to a corresponding cell memory according to a priority level predetermined for each virtual channel.

18. The dynamic virtual channel management apparatus as claimed in claim 17, wherein the plurality of the cell memories output the stored cells in a descending order of the priority levels.

* * * * *